(12) United States Patent  
Markley et al.

(10) Patent No.: US 8,276,578 B2
(45) Date of Patent: Oct. 2, 2012

(54) SKID PLATE FOR CONCRETE SAW

(75) Inventors: Charles E. Markley, Anaheim Hills, CA (US); Deo M. Magakat, Colton, CA (US)

(73) Assignee: Soff-Cut International, Inc., Corona, CA (US)

( * ) Notice: Subject to any disclaimer, the term of this patent is extended or adjusted under 35 U.S.C. 154(b) by 0 days.

(21) Appl. No.: 12/839,266

(22) Filed: Jul. 19, 2010

(65) Prior Publication Data

US 2010/0288259 A1 Nov. 18, 2010

Related U.S. Application Data

(60) Continuation of application No. 11/804,841, filed on May 21, 2007, now Pat. No. 7,757,683, which is a continuation of application No. 11/413,398, filed on Apr. 28, 2006, now abandoned, which is a division of application No. 10/931,562, filed on Aug. 31, 2004, now Pat. No. 7,163,010.

(60) Provisional application No. 60/575,476, filed on May 28, 2004.

(51) Int. Cl.
B28D 1/04 (2006.01)

(52) U.S. Cl. .......................... 125/13.01; 125/14; 125/15

(58) Field of Classification Search .................. 125/12, 125/13.01, 14, 15, 35, 36; 30/371, 374, 375, 30/388, 390; 451/352, 353, 358; 83/375; 264/152, 162

See application file for complete search history.

(56) References Cited

U.S. PATENT DOCUMENTS

| 932,591 | A | 8/1909 | Smith |
|---|---|---|---|
| 995,971 | A | 6/1911 | Keyes |
| 1,106,225 | A | 8/1914 | Kreeger |
| 1,207,764 | A | 12/1916 | Johnson |
| 1,356,339 | A | 10/1920 | Clarke |
| 1,404,342 | A | 1/1922 | Clarke |
| 1,683,292 | A | 9/1928 | Heltzel |
| 1,718,840 | A | 9/1929 | Thomasson |
| 1,726,665 | A | 9/1929 | Heltzel |
| 1,731,872 | A | 10/1929 | Schrons |
| 1,736,538 | A | 11/1929 | Kurtz |
| 1,740,074 | A | 12/1929 | Crowe |
| 1,801,622 | A | 4/1931 | Blass |
| 1,862,612 | A | 6/1932 | Thomasson |
| 1,916,563 | A | 7/1933 | Edge |
| 1,916,887 | A | 7/1933 | McClain |
| 1,953,826 | A | 4/1934 | Heltzel |
| 2,468,336 | A | 4/1949 | Lewis |
| 2,487,277 | A | 11/1949 | Siftar |
| 2,569,682 | A | 10/1951 | Lewis |
| 2,722,244 | A | 11/1955 | Shultz |
| 2,854,043 | A | 9/1958 | Raymond |
| 2,949,068 | A | 8/1960 | Gresham |
| 2,996,089 | A | 8/1961 | McCarty |
| 3,098,413 | A | 7/1963 | Guntert |
| 3,303,861 | A | 2/1967 | Kane |

(Continued)

*Primary Examiner* — Dung Van Nguyen
(74) *Attorney, Agent, or Firm* — Novak Druce + Quigg LLP

(57) ABSTRACT

A skid plate for a concrete saw is integrally cast having two end mounting portions and a middle portion with a slot in the middle portion. A horizontal slot in a leading end mounting portion cooperates and a vertical slot in the trailing end portion releasably engage pins on the saw to allow the skid plate to be easily fastened to and removed from the saw. A spring loaded latch mechanism holds the pins in the slots.

24 Claims, 21 Drawing Sheets

U.S. PATENT DOCUMENTS

| | | | |
|---|---|---|---|
| 3,381,595 | A | 5/1968 | Hanson |
| 3,623,518 | A | 11/1971 | Nicatra |
| 3,722,496 | A | 3/1973 | Schuman |
| 4,075,920 | A | 2/1978 | Neal |
| 4,175,788 | A | 11/1979 | Jacobson |
| 4,236,356 | A | 12/1980 | Ward |
| 4,247,148 | A | 1/1981 | Eriksson |
| 4,253,816 | A | 3/1981 | Tobias et al. |
| 4,310,198 | A | 1/1982 | Destree |
| 4,334,356 | A | 6/1982 | Krosunger |
| 4,356,748 | A | 11/1982 | Tilton |
| 4,545,121 | A | 10/1985 | Armbuster et al. |
| 4,549,456 | A | 10/1985 | Elmaraghy |
| 4,748,966 | A | 6/1988 | Kennedy |
| 4,769,201 | A | 9/1988 | Chiuminatta et al. |
| 4,889,675 | A | 12/1989 | Chiuminatta |
| 4,903,680 | A | 2/1990 | Chiuminatta et al. |
| 4,928,662 | A | 5/1990 | Chiuminatta et al. |
| 4,998,775 | A | 3/1991 | Hollifield |
| 5,167,215 | A | 12/1992 | Harding |
| 5,241,946 | A | 9/1993 | Yelton et al. |
| 5,305,729 | A * | 4/1994 | Chiuminatta et al. .......... 125/12 |
| 5,311,705 | A | 5/1994 | Zuzelo |
| 5,429,109 | A | 7/1995 | Chiuminatta et al. |
| 5,540,129 | A | 7/1996 | Kalber |
| 5,570,677 | A | 11/1996 | Chiuminatta et al. |
| 5,575,271 | A | 11/1996 | Chiuminatta et al. |
| 5,579,553 | A | 12/1996 | Holley |
| 5,664,553 | A * | 9/1997 | Chiuminatta et al. ..... 125/13.01 |
| 5,689,072 | A * | 11/1997 | Chiuminatta et al. ... 73/862.541 |
| 5,950,612 | A | 9/1999 | Zuzelo |
| 6,019,433 | A | 2/2000 | Allen |
| 6,112,736 | A | 9/2000 | Bearden |
| 6,349,712 | B1 | 2/2002 | Halstead |
| 6,536,422 | B1 | 3/2003 | Zuzelo |
| 6,568,088 | B1 | 5/2003 | Ende |
| 6,736,126 | B2 * | 5/2004 | Schroer et al. ............. 125/13.01 |
| 7,007,686 | B1 | 3/2006 | Zuzelo |
| 7,163,010 | B2 | 1/2007 | Markley et al. |
| 7,258,115 | B2 | 8/2007 | Markley et al. |
| 7,273,048 | B1 | 9/2007 | Zuzelo |
| 7,757,683 | B2 * | 7/2010 | Markley et al. ............ 125/13.01 |

* cited by examiner

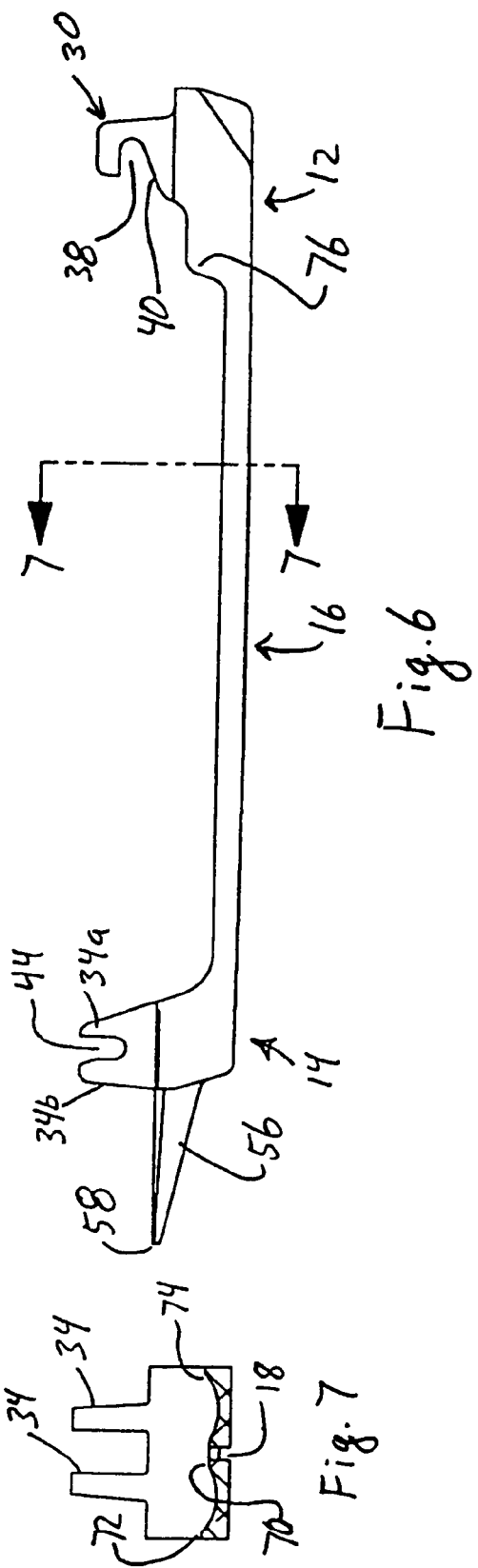

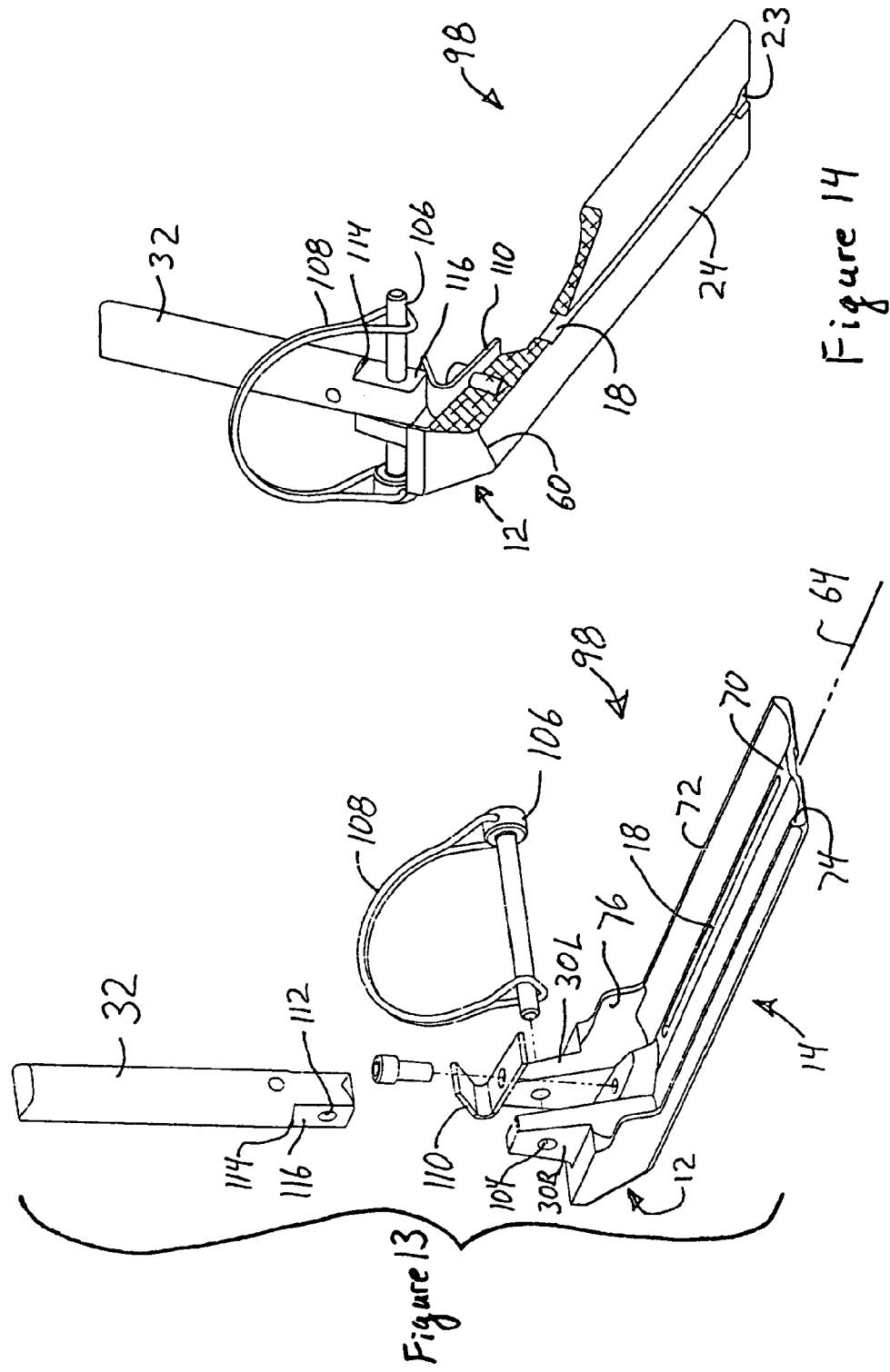

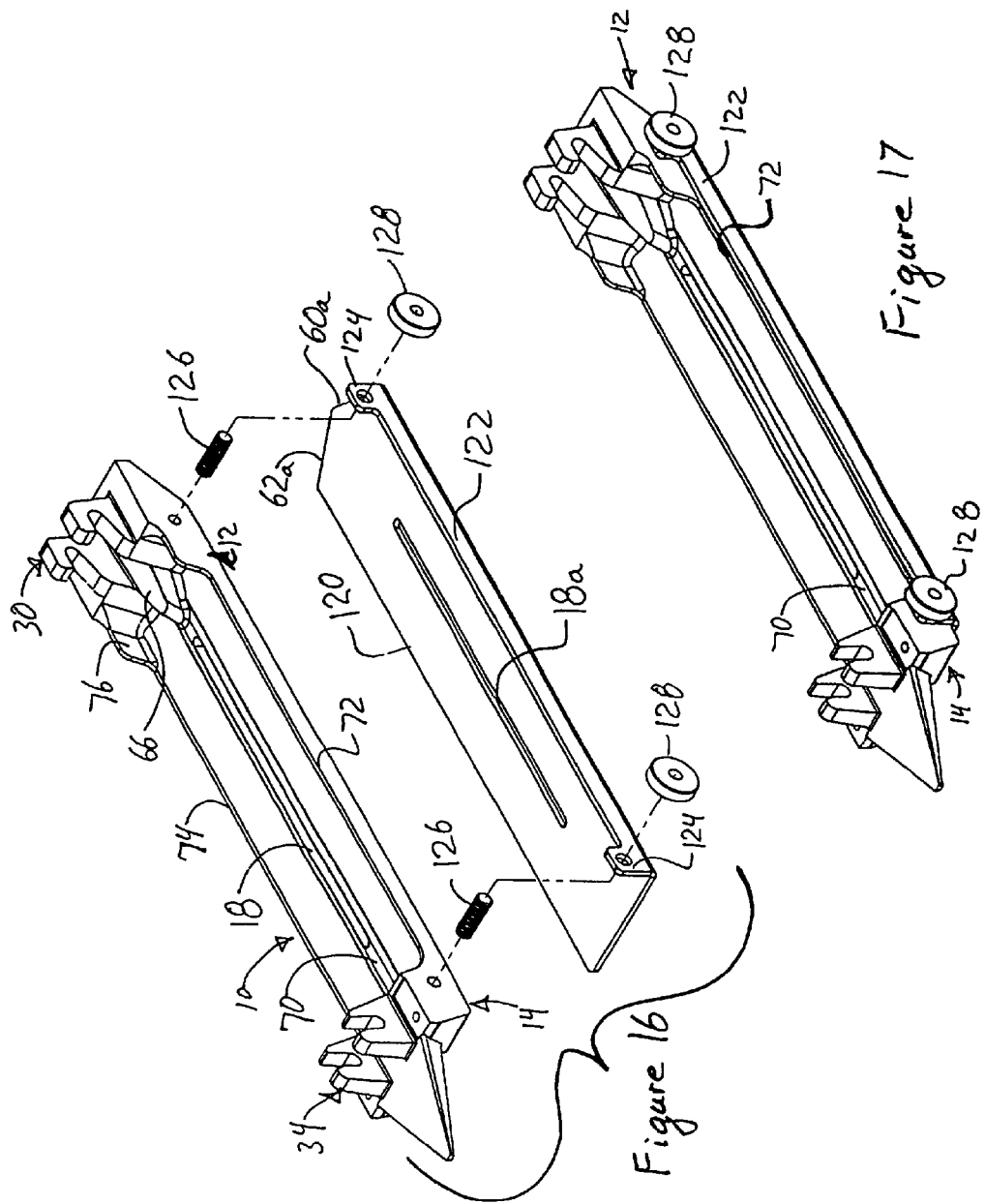

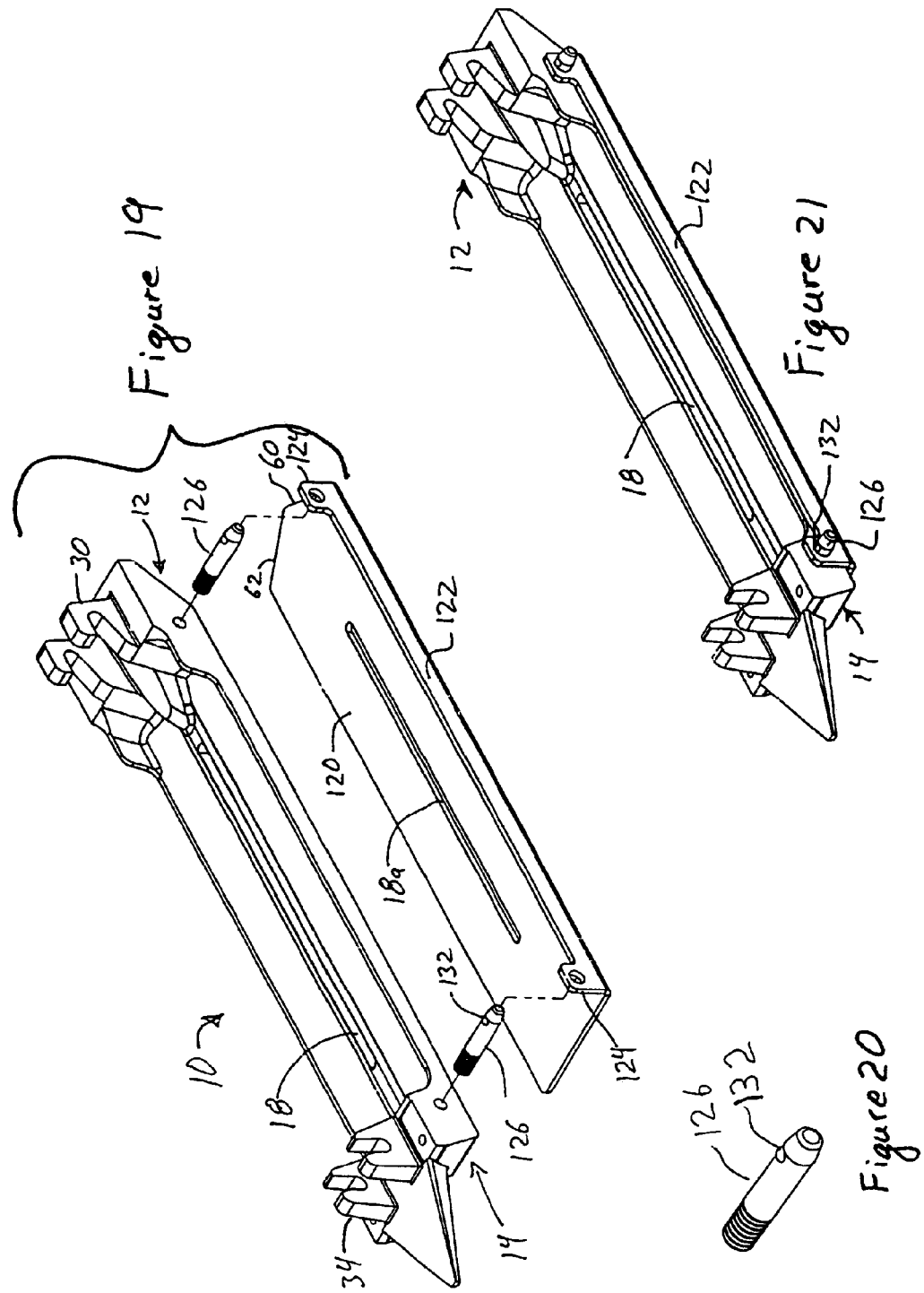

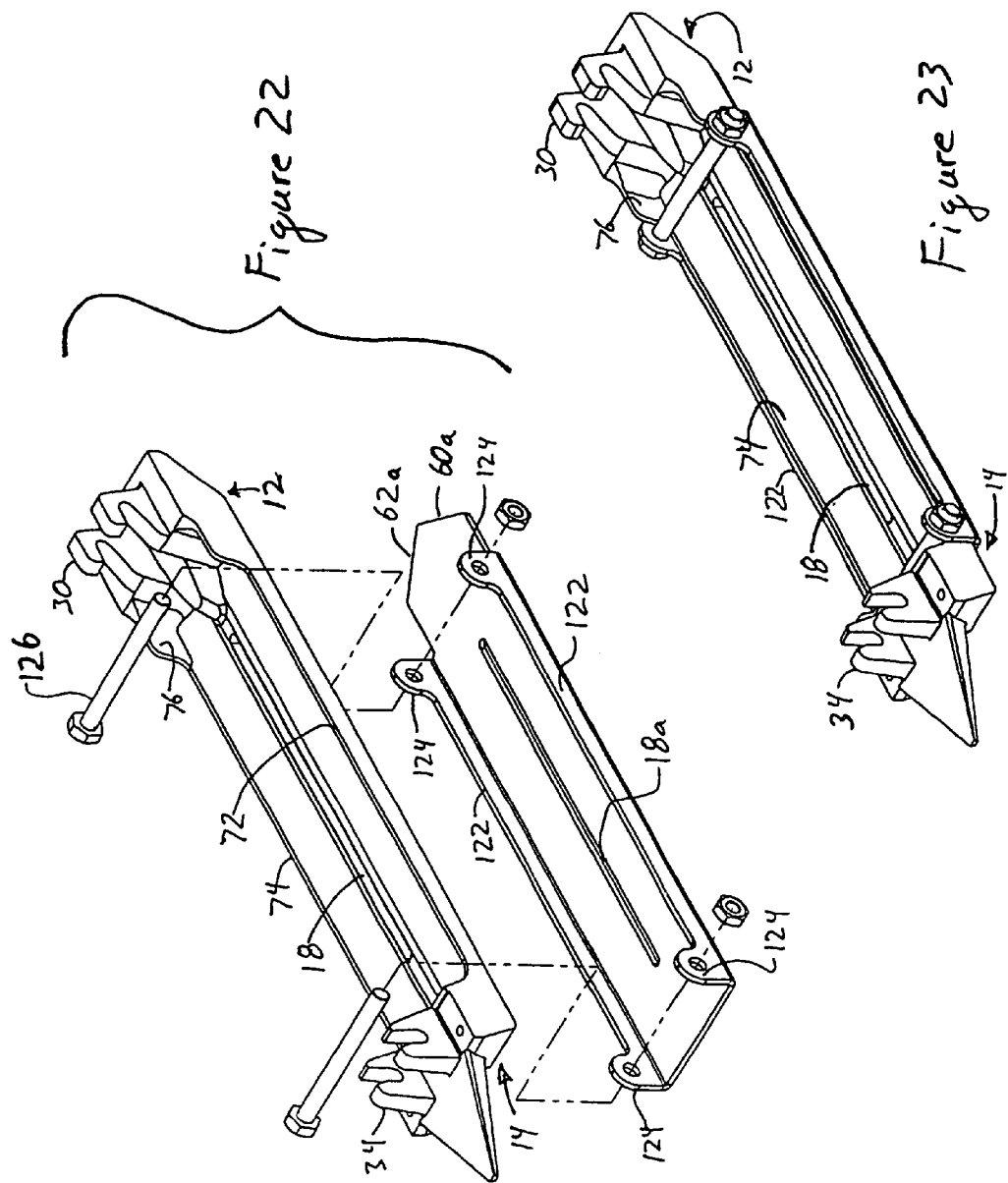

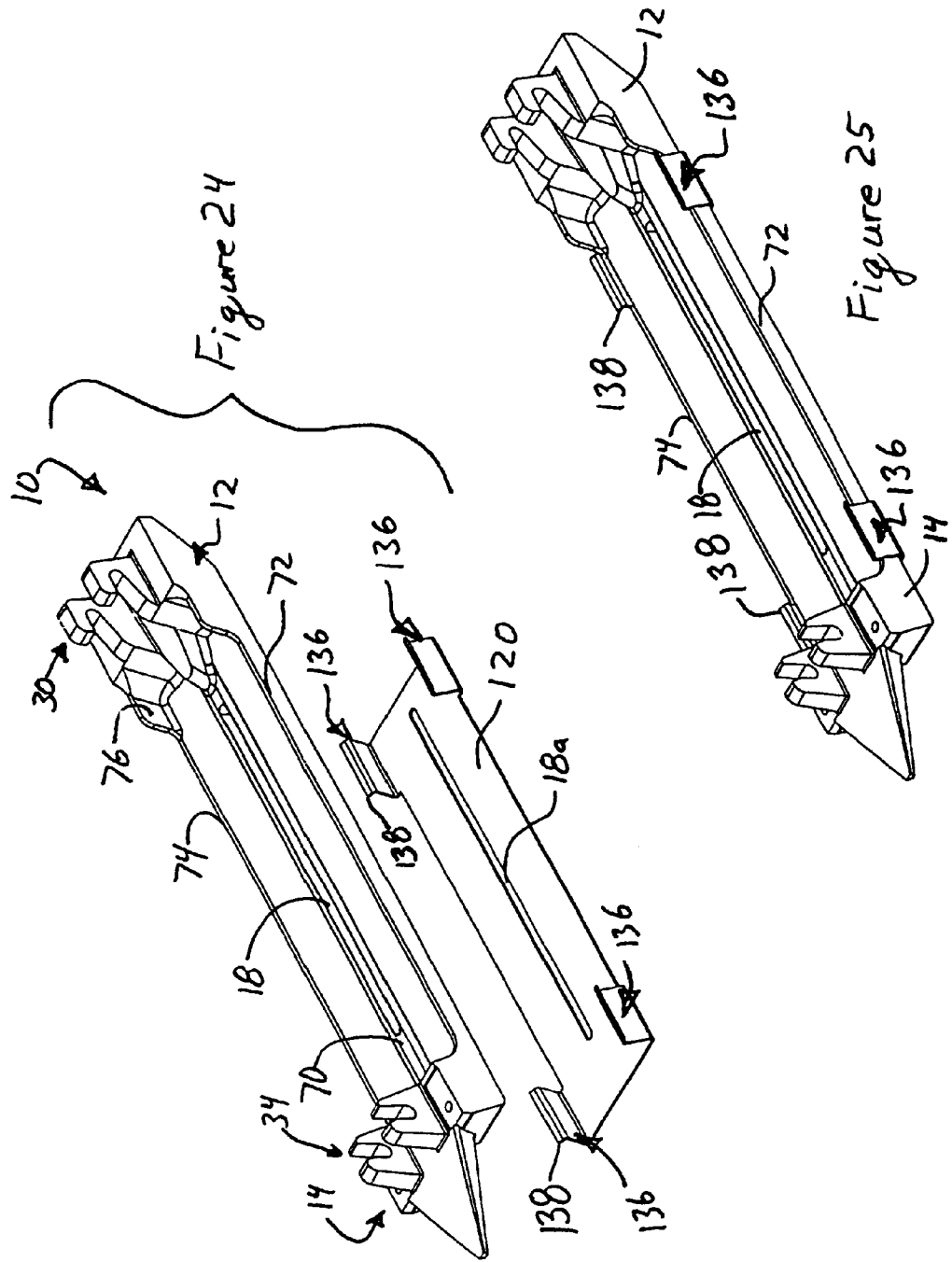

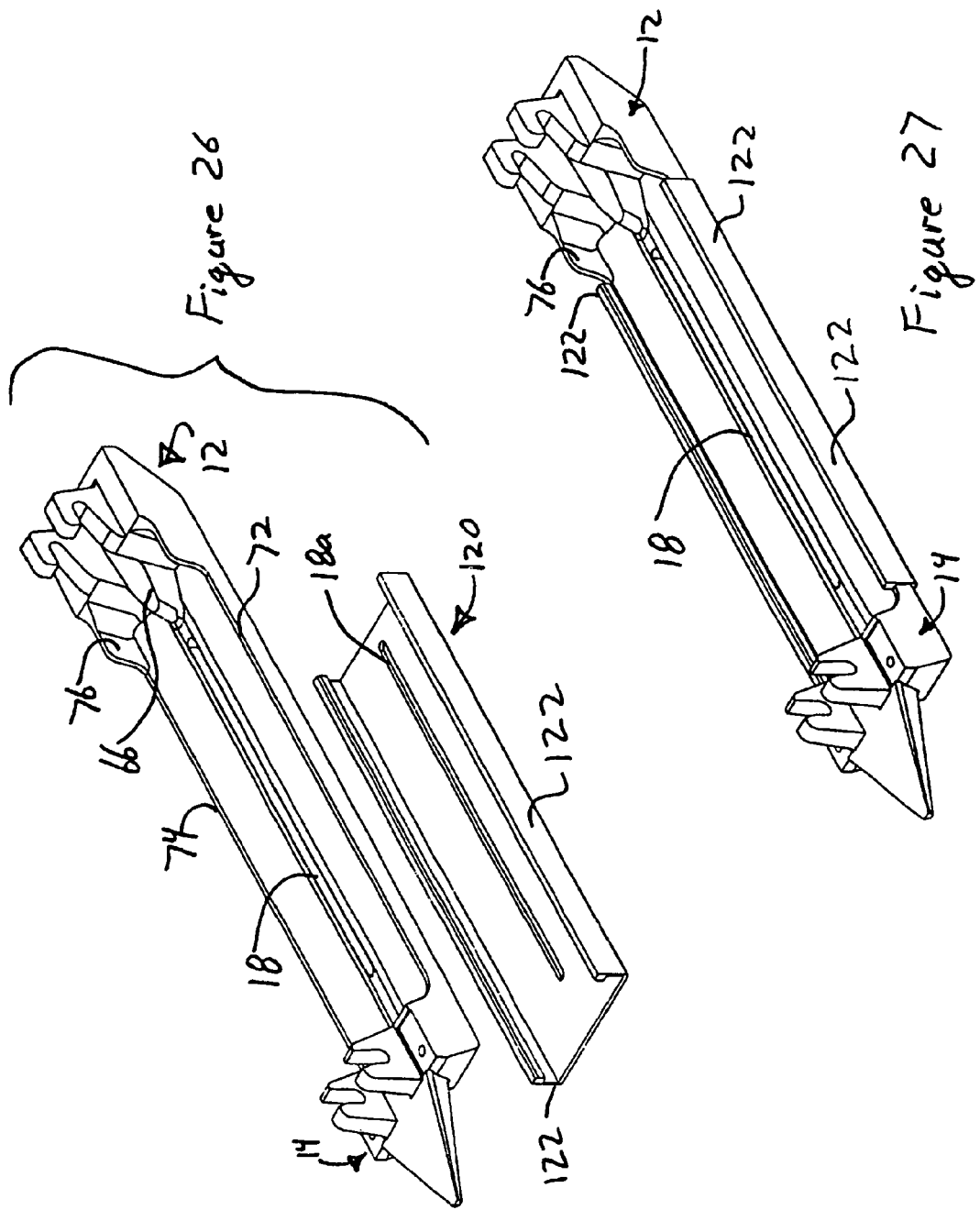

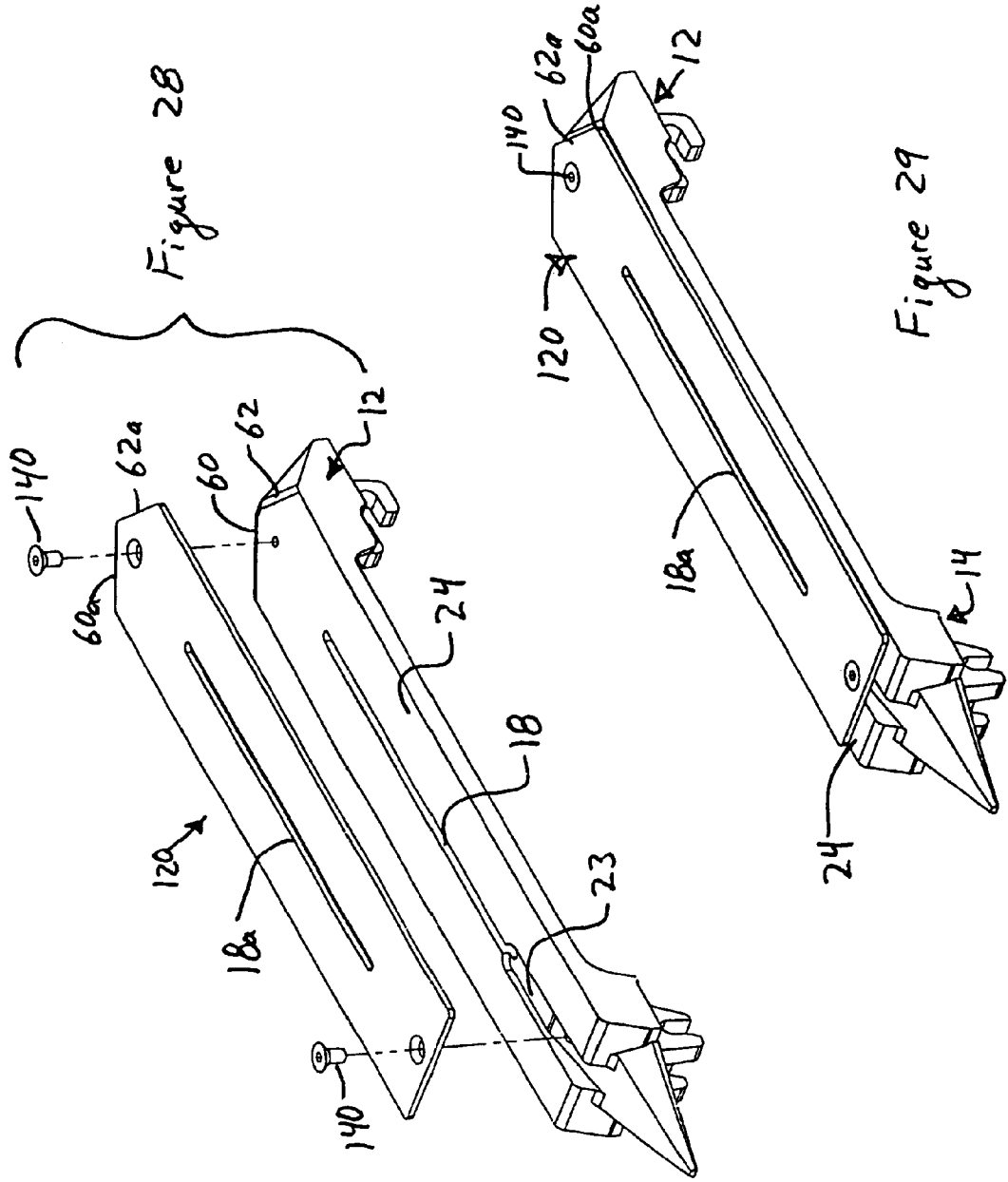

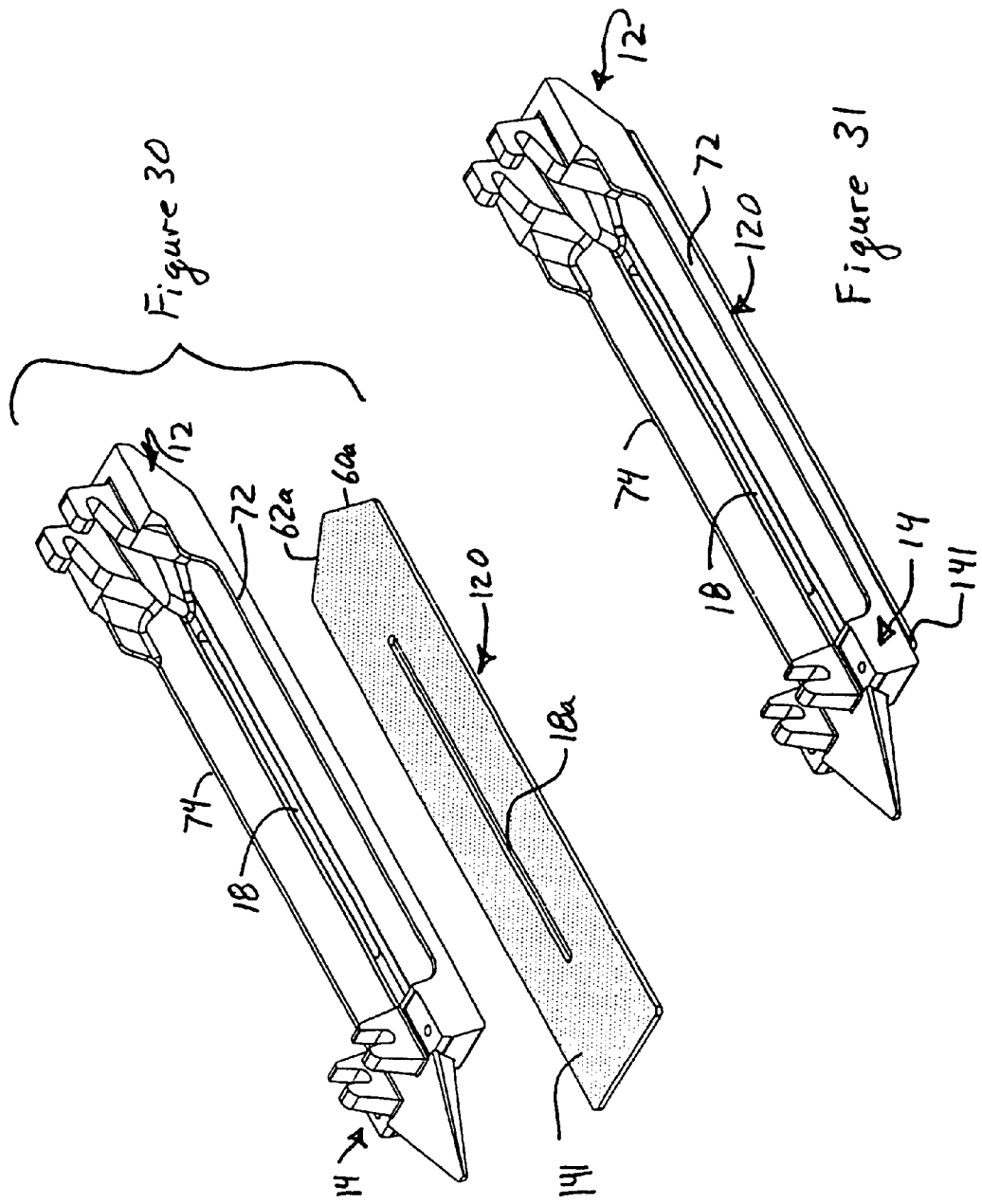

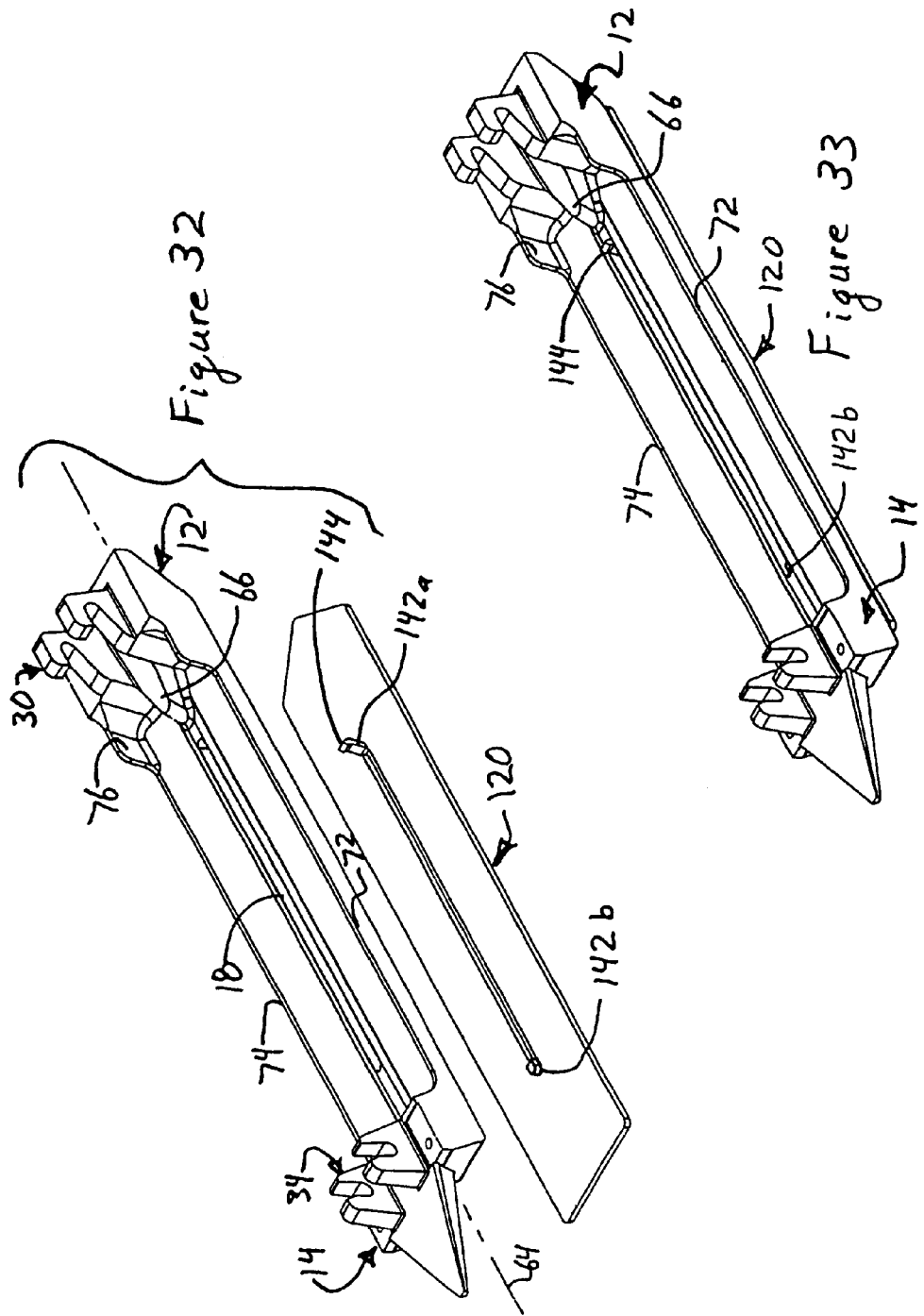

SKID PLATE FOR CONCRETE SAW

RELATED APPLICATIONS

This application is a continuation of U.S. application Ser. No. 11/804,841, filed May 21, 2007 now U.S. Pat. No. 7,757,683, which is a continuation of U.S. application Ser. No. 11/413,398, filed Apr. 28, 2006 now abandoned, which is a divisional of U.S. application Ser. No. 10/931,562, filed Aug. 31, 2004 now U.S. Pat. No. 7,163,010, which claims priority benefit of U.S. provisional application No. 60/575,476. U.S. application Ser. No. 11/804,841, U.S. application Ser. No. 11/413,398, U.S. application Ser. No. 10/931,562, and U.S. provisional application No. 60/575,476 are each incorporated by reference herein in their entireties.

BACKGROUND OF THE INVENTION

Slotted skid plates are used with concrete saws to cut concrete before it is hardened to the green stage. This is described in U.S. Pat. No. 4,769,201. But the concrete is very abrasive. Thus, the skid plates are made of steel to resist the wear from sliding over the concrete surface and to resist the wear from the abrasive concrete carried by the blade at the cutting edge and which widens the slot in the skid plate. The skid plates were made of sheet steel and bent to the desired shape. But the steel skid plates warp during manufacture and use and that causes raveling as the cut concrete grooves ravel unless the skid plates are flat against the concrete during cutting. There is thus a need for an improved skid plate that remains flat against the concrete after manufacture and during use.

One patent addresses this problem of the non-flat skid plates by using a truss to warp the skid plate into a desired configuration, as described in U.S. Pat. No. 5,507,273. But adjusting the truss and fixing the truss to lock in the desire distortion is complex and time consuming. Indeed, it is so difficult that special equipment and methods are used, as described in U.S. Pat. No. 5,689,072. There is thus a need for a better way to achieve a flat skid plate during cutting. A less expensive way to make skid plates is also desirable.

The skid plates are fastened to the saw by inserting pins through holes in the distal ends of spring loaded pistons The pistons resiliently urge the skid plate against the concrete surface during cutting. Because the alignment of the skid plate with the saw blade affects the quality of the groove cut in the concrete, the pins holding the skid plate to the saw have a very tight fit with the mating holes in the pistons. But removing the pins is difficult because the pins often freeze in place. The skid plates thus become difficult to remove and that encourages workers to leave them as long as possible, and often too long. Unfortunately, the skid plates wear, sometimes after as little as 1200 feet of cutting and the quality of the cut groove deteriorates with the wear. There is thus a need for a better way to fasten the skid plate to the saw and to make it easy to remove a used skid plate from the saw and to fasten a replacement skid plate to the saw.

BRIEF SUMMARY OF THE INVENTION

A cast skid plate for a concrete cutting saw is provided. The saw has a rotating blade with sides and rotating about a rotational axis to cut a groove in a concrete surface during use of the saw. The skid plate has an elongated support portion having a longitudinal slot therein sized to fit within about ⅛ inch or less of the sides of the concrete cutting blade during use of the skid plate. The elongated support is slightly bowed an amount selected to substantially counteract bowing of the skid plate that occurs when the elongated support is urged against the concrete surface during cutting of the concrete. The bow is cast into the skid plate. At least one saw mounting portion is provided, and is offset from the elongated support. The elongated support and at least one saw mounting portion are also integrally cast with the skid plate.

Further variations of the cast skid plate cause the curvature of a bottom surface of the skid plate to extend beyond leading and trailing end portions of the skid plate by about ⅛ inch or less. The skid plate bows toward the concrete. Preferably there are two mounting portions forming a front and rear mounting portion, one each at an opposing end of the elongated support portion. Advantageously, but optionally, there is a front mounting portion having a front mounting yoke, and there is a rear mounting portion having a rear yoke. The elongated portion and at least one mounting portion are preferably cast of metal other than iron, preferably aluminum, but could be cast of a polymer or of a ferrous alloy.

In a further variation the cast skid plate has two mounting portions, one of which comprises a slot extending along an axis toward and away from the elongated support portion and configured to receive a pin orientated generally parallel to the rotational axis. The other mounting portion comprises a slot that is generally parallel to the concrete surface during cutting. Preferably, but optionally, a snap lock or spring loaded clip holds a mating portion of the saw engaged in the vertical slot in order to provide for a quick-release connection with the skid plate.

In a further variation the skid plate has a leading and trailing end and the leading end of the skid plate has an end that is angled relative to the longitudinal slot. Moreover, the leading end of the skid plate preferably has a V shaped configuration in the plane of the elongated portion with the point of the V oriented away from a trailing end and toward the leading end and that helps shove concrete debris from cutting out of the way of the skid plate so the debris is not run over by the skid plate.

The skid plate preferably comprises a single part connected to the saw at opposing ends. But in a further embodiment the skid plate is formed by two separate segments each of which has a separate saw mount portion, and each of which has a slot therein which slot extends along a portion of the cutting blade during use of the saw.

There is also advantageously provided a skid plate having two saw mounting portions on the skid plate and an elongated support portion which are integrally cast of metal. The saw mounting portions are offset from the support portion a predetermined distance. An elongated slot is either cut into the support portion or integrally cast with the support portion. The slot is sized relative to the cutting blade to support the concrete surface during cutting so cutting does not produce unacceptable raveling of the cut groove during use of the skid plate. The skid plate is preferably cast of non-ferrous metal, but an iron base, metal could be used, as could polymers. The leading end of the skid plate preferably, but optionally also has an angled end forming a V with the apex of the V facing forward and in the same plane as the slot. The support portion is also preferably, but optionally curved about an axis generally parallel to the first axis by an amount selected to at least partially offset the deformation of the skid plate occurring when the saw urges the skid plate against the concrete surface during cutting.

There is also provided a further skid plate having first means for mounting the skid plate to the concrete saw and second means for supporting the concrete surface during cutting. The first and second means are simultaneously and integrally cast. The first and second means are preferably formed of cast metal, and more preferably cast of a metal the dominant portion of which is other than iron. The first and second means could be cast of a polymer. The second means preferably, but optionally comprises a slot that is cut in the elongated portion after the elongated support skid plate and mounting portion are cast, but the second means could comprise a slot that is cast in the elongated portion. As with the prior embodiments, there is preferably an angled front end on the support portion.

A further embodiment uses a replaceable plate that removably fastens to the skid plate and abuts the bottom of the skid plate. Various fastening mechanisms can be used, including snap locks that cooperate with the sides or flanges on the skid plate, threaded fasteners that engage the skid plate at various locations, resilient prongs that engage the edges around holes or slots in the skid plate, and adhesives. The mechanisms for fastening the plate to the skid plate restrain the plate and skid plate from longitudinal movement, and lateral movement, so that a slot in the plate aligns with the blade extending through the slot in the skid plate, in order to prevent raveling of the concrete surface during cutting. The slot can be formed in the plate, or cut by the blade. The slot can end internally to the plate, or can extend to a trailing edge of the plate. A partial slot or widened slot can be used at the trailing end of the plate in order to avoid having the plate trowel over the cut groove.

BRIEF DESCRIPTION OF THE DRAWINGS

FIG. 6 is a side view of the skid plate of FIG. 2;

FIG. 7 is a sectional view taken along section 7-7 of FIG. 6;

FIG. 13 is an exploded perspective view of a further embodiment showing a front segment of a skid plate;

FIG. 14 is a perspective view of the skid plate of FIG. 13 with a portion cut-away to show the connection to a mounting shaft or piston of a saw;

FIG. 16 is an exploded perspective view of a further embodiment of a cast skid plate showing a removable plate held by a releasable fastener;

FIG. 17 is a perspective view of the skid plate of FIG. 16;

FIG. 19 is an exploded perspective view of a further embodiment of a cast skid plate showing a removable plate held by a further releasable fastener;

FIG. 20 is a perspective view of the further releasable fastener of FIG. 19;

FIG. 21 is a perspective view of the skid plate of FIG. 19;

FIG. 22 is an exploded perspective view of a further embodiment of a cast skid plate showing a removable plate held by a releasable fastener;

FIG. 23 is a perspective view of the skid plate of FIG. 22;

FIG. 24 is an exploded perspective view of a further embodiment of a cast skid plate showing a removable plate held by a releasable fastener;

FIG. 25 is a perspective view of the skid plate of FIG. 24;

FIG. 26 is an exploded perspective view of a further embodiment of a cast skid plate showing a removable plate held by a releasable fastener;

FIG. 27 is a perspective view of the skid plate of FIG. 26;

FIG. 28 is an exploded perspective view of a further embodiment of a cast skid plate showing a removable plate held by a releasable fastener;

FIG. 29 is a perspective view of the skid plate of FIG. 28;

FIG. 30 is an exploded perspective view of a further embodiment of a cast skid plate showing a removable plate held by a releasable fastener;

FIG. 31 is a perspective view of the skid plate of FIG. 30;

FIG. 32 is an exploded perspective view of a further embodiment of a cast skid plate showing a removable plate held by a releasable fastener; and FIG. 33 is a perspective view of the skid plate of FIG. 32.

DETAILED DESCRIPTION

Figure 1:
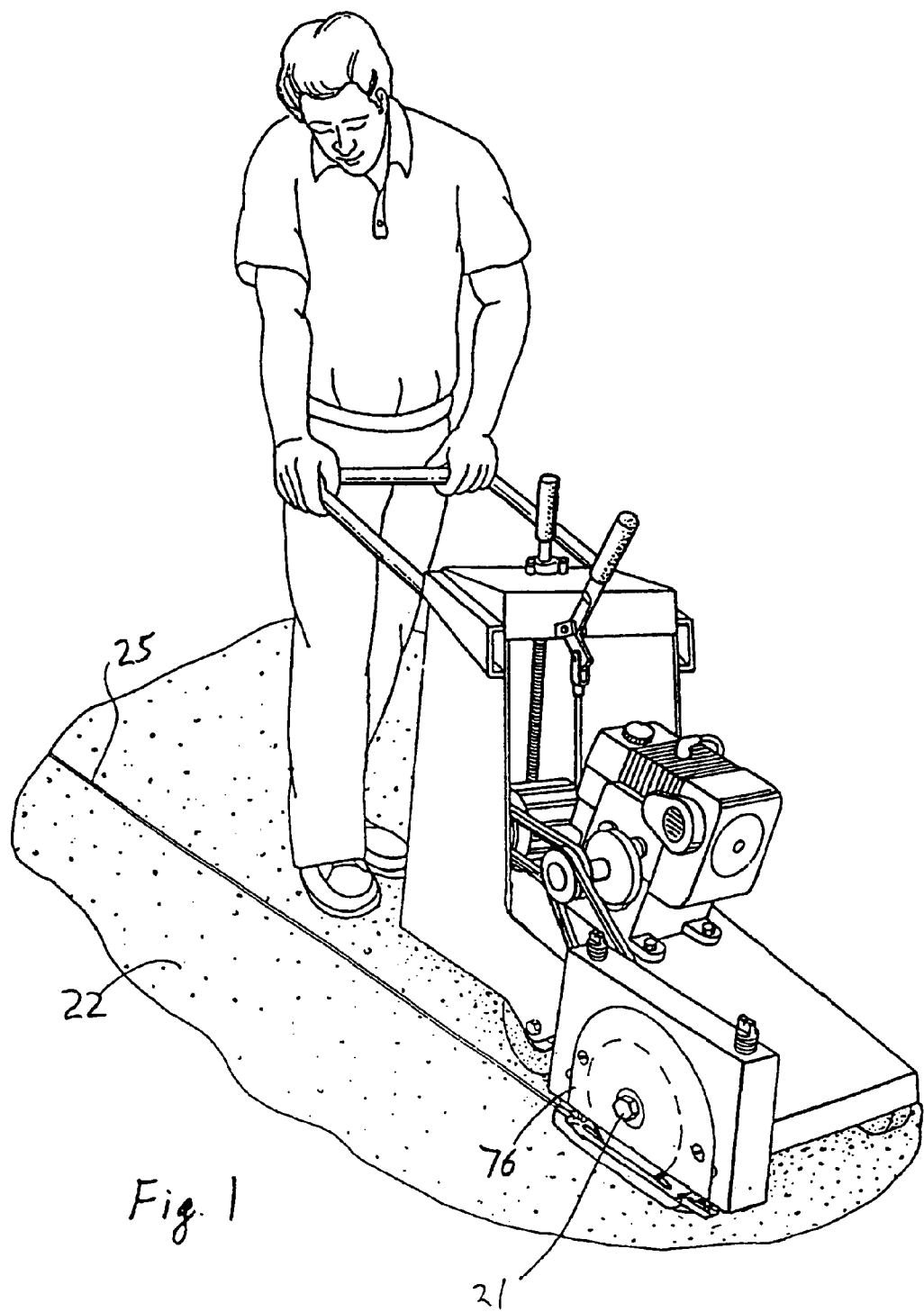
FIG. 1 is a perspective view of a saw with a cast skid plate.

Referring to FIGS. 1-8, a cast skid plate 10 is shown having a leading or front end 12, a rear or trailing end 14 and a middle portion or support portion 16. The skid plate is preferably cast of metal, but polymers could be used, especially if cast with metal inserts as described later. A slot 18 extends through the middle portion 16 so cutting blade 20 rotating about drive axis 21 can cut the concrete surface 22 on which the skid plate 10 moves during cutting. A lower surface 24 (FIG. 4) of the skid plate 10 abuts the concrete during cutting and forms an elongated support portion which supports the concrete surface 22 along the cutting blade 20 during cutting. In the depicted configuration the lower surface 24 extends across all of the middle portion 16 and parts of the front 12 and rear 14 portions of the skid plate.

During use, a wheeled saw (FIG. 1) rotates the cutting blade 20, preferably but optionally, in an up-cutting direction to cut grooves 25 in the concrete surface 22. Front and rear, spring loaded mounts 32, 36, (FIG. 8) resiliently urge the skid plate 10 against the concrete surface 22 during cutting. A groove, slot or tunnel 23 (FIG. 4) is formed in the lower surface 24 at the trailing end of the slot 18 in order to avoid troweling over and possibly closing the groove cut by the blade 20 that extends through the groove 18 to cut groove 25 in the concrete.

As used herein the term front or forward or leading refers to the direction in which the saw normally moves when doing the majority of cutting on the concrete surface 22. The concrete saw could be pulled backwards and it would cut a groove in the concrete, but the saw is not designed to go that way for any substantial distance. The term rear or trailing refers to the direction opposite front or forward or leading. The term up or upward or above refers to a direction away from the concrete during cutting. The term down or downward or below refers to a direction toward the concrete surface during cutting.

Figure 2:
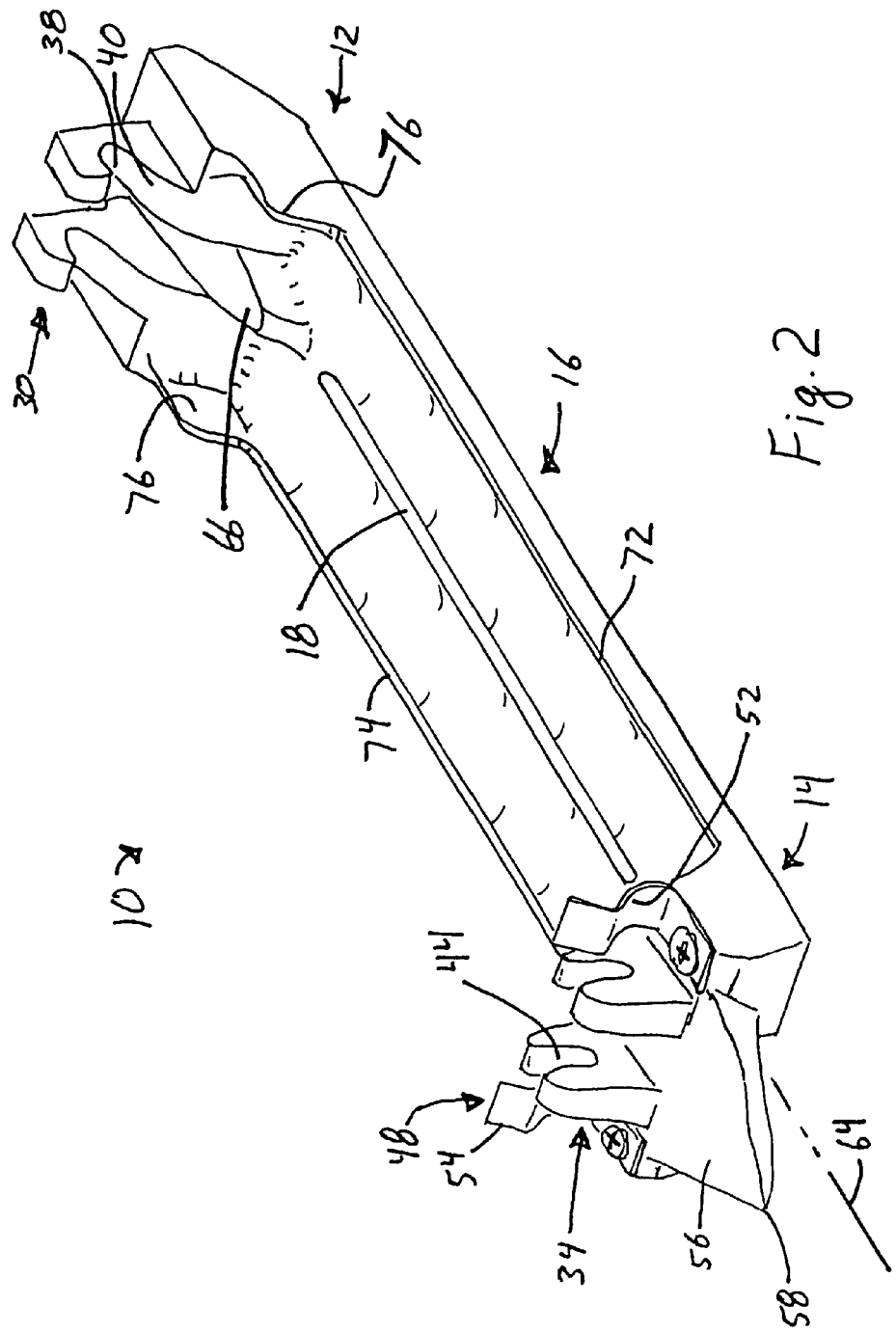
FIG. 2 is a top perspective view of the cast skid plate of FIG. 1.
Figure 3:
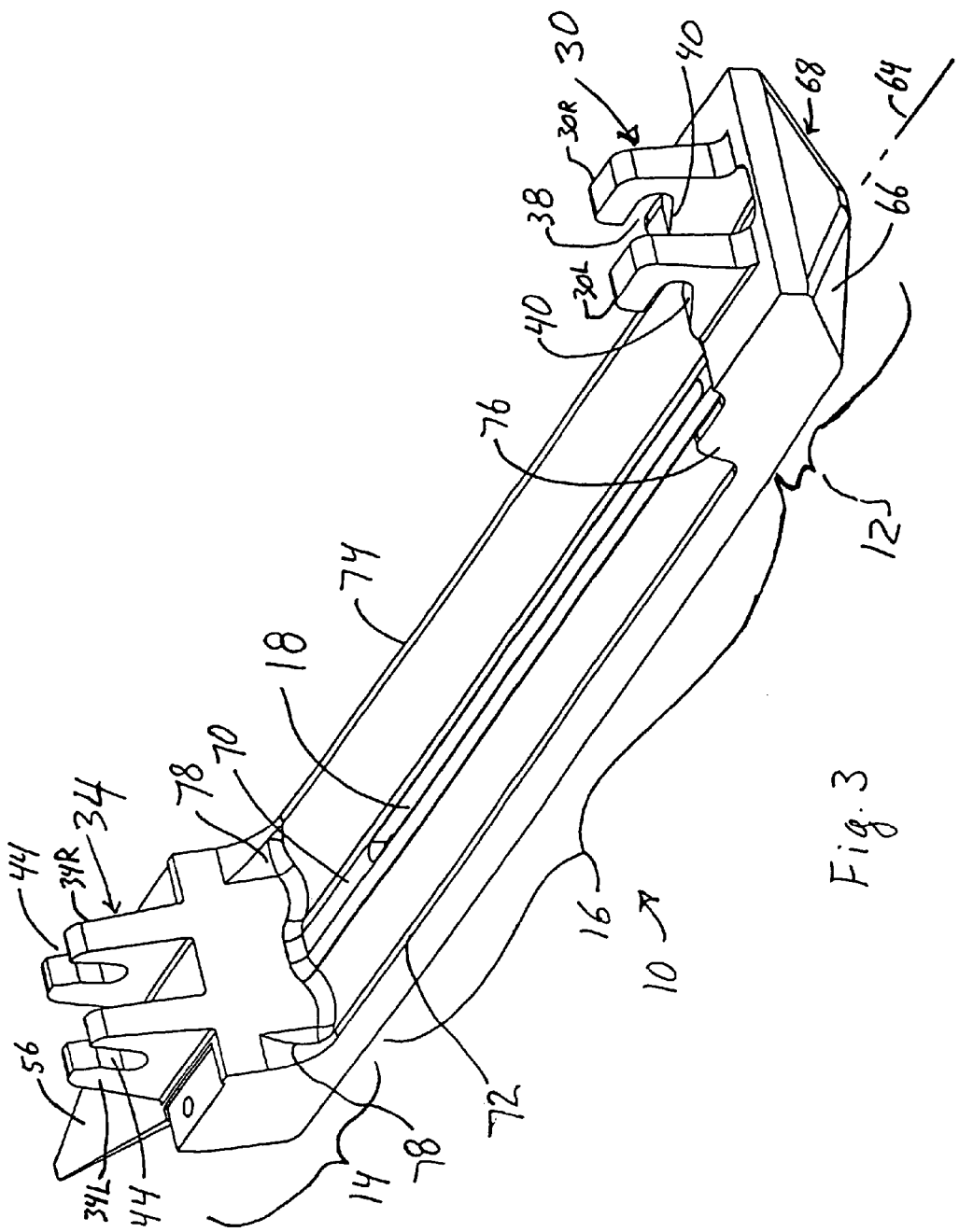
FIG. 3 is a perspective view of the cast skid plate of FIG. 2 from the other end of the skid plate.
Figure 8:
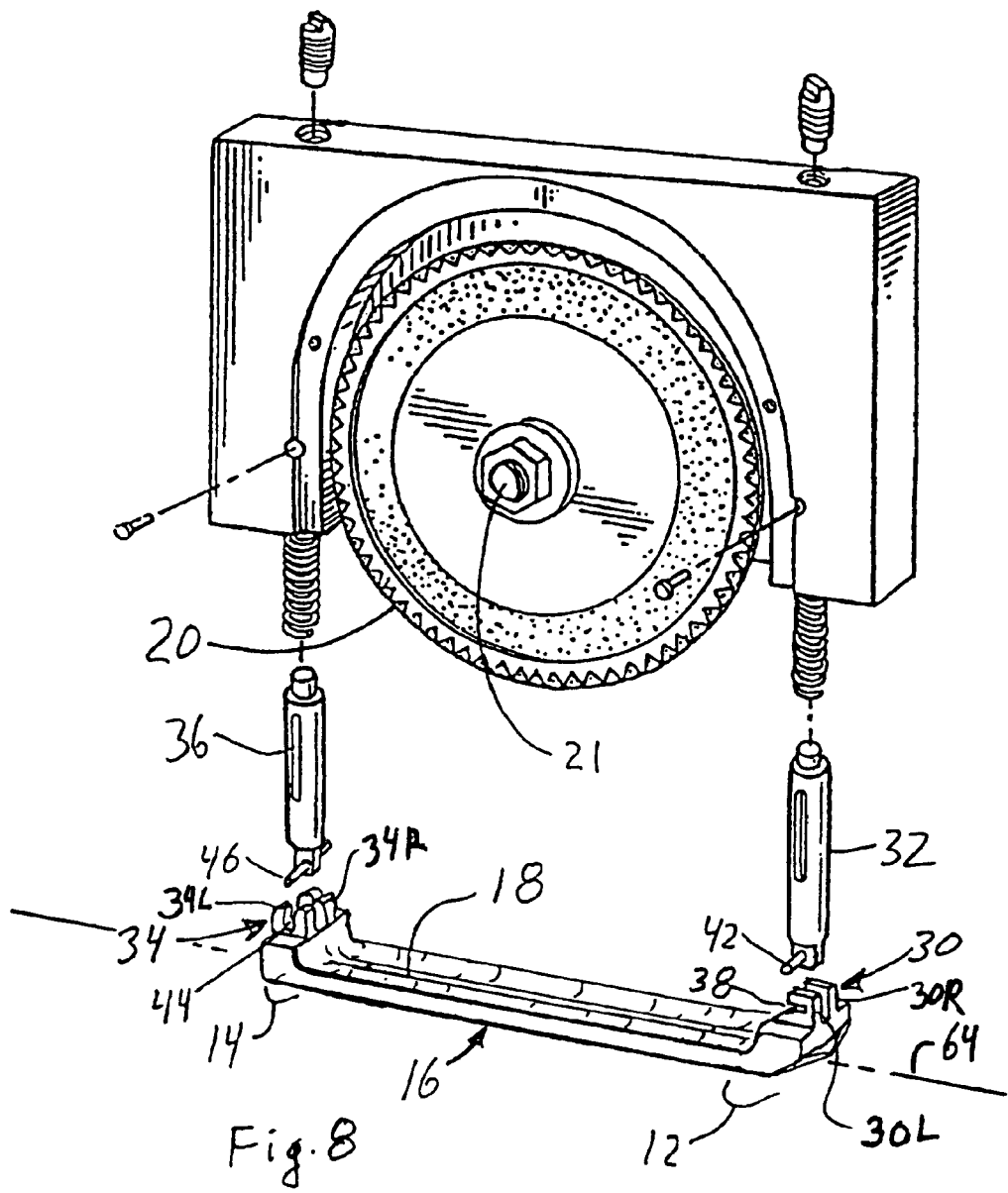
FIG. 8 is an exploded perspective view of a saw blade mounting block and the skid plate of FIG. 1.
Figure 9:
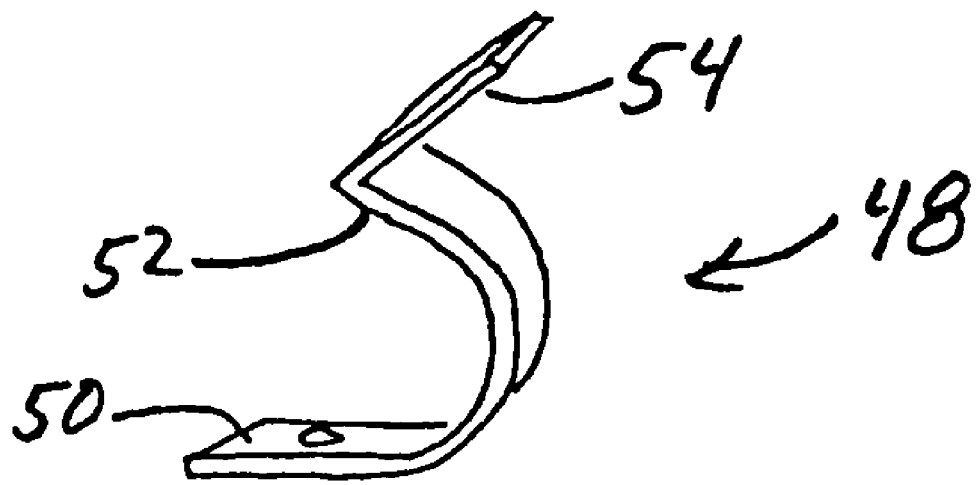
FIG. 9 is a perspective view of the clip of FIG. 2.
Figure 10:
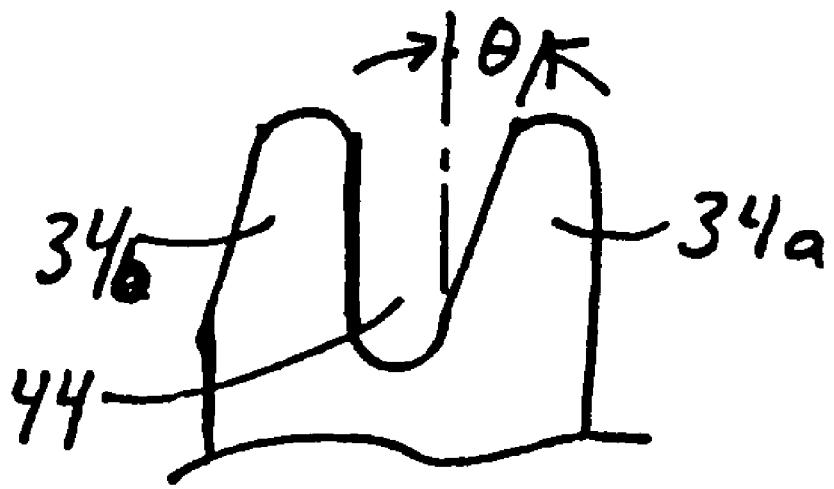
FIG. 10 is a partial side view of a rear mount taken from FIG. 2.

Referring to FIGS. 2 and 8, front mounting yokes 30 are on the top of the front end 12 and releasably connect to the front mount 32 on the saw. The front mount is shown as spring loaded pistons 32 but need not be so. Rear mounting yokes 34 are on the rear 14 and releasably connect to the rear mount 36 on the saw. The mounting yokes 30, 34 are integrally cast with the front and rear ends 12, 14, respectively, and form front and rear mounting portions. Various configurations can be used for the mounting portions 30, 34. The mounting portions 30, 34 are offset relative to the bottom surface 24 of the skid plate 10.

In the depicted embodiment, the front mounting portion 30 comprise a pair of spaced-apart mounts 30L, 30R, with one mount on each side of the longitudinal axis 64. Each front yoke mount 30 has a slot 38 opening rearward with a slightly downwardly inclined lower side 40 on the wall forming the slot. The opposing, upper side of each slot 38 is generally horizontal. The downwardly inclined side 40 forms a wider opening to the slot 38 which makes it easier to insert a mating front projection 42 (FIG. 8) extending from the front piston 32 on the saw. Preferably, but optionally, the projection 42 comprises a steel pin or roller passed through a distal end of the front piston 32, with the distal end of the piston fitting between the front yokes 30. The use of horizontal slots in front yokes of a skid plate, located to engage a front pin through the front piston 32 are found on prior art saws.

The rear mounting yoke 34 also preferably has two spaced apart mounts 34L, 34R, each located on opposing sides of the longitudinal axis 64. Each rear mount 34 has a rear slot 44 opening upward to receive a rear projection 46 fastened to the rear piston 36 on the saw. In this embodiment the rear yokes 34 are located on opposing sides of the longitudinal axis 64, and each individual yoke further has a slot 44 opening upward with the slot 44 preferably being wider at the top than the bottom which makes it easier to insert the mating projection 46 (FIG. 8) extending from the rear piston 36 on the saw. Preferably, but optionally, the projection 46 comprises a steel pin or roller passed through a hole in the distal end of the rear piston 36, with the distal end of the piston fitting between the rear yokes 34.

The front pin 42 on front piston 32 is slid horizontally into the slot 38 on the front yoke 30. The spacing between the front and rear pins 42, 46 is such that when the front pin 42 is near to or abuts the end of the front slot 38 then the rear pin 46 aligns with the rear slot 44 so the rear piston 36 is then slid between rear yokes 34 with the rear pin 46 engaging the bottom of slot 44 in rear yoke 34. The relative movement can be achieved by moving the skid plate and its rear slot 44 toward the rear pin 46 or moving the saw and rear pin toward the skid plate. Preferably, the front pin 42 does not abut the end of the front slot, but is near the middle of the front slot 38.

Referring to FIGS. 2 and 8-10, clip 48 (FIG. 2) on the rear portion 14 or other fastening mechanism holds the rear pin 46 in the slot 44 and prevents unintentional disengagement of the rear pin 46 from the rear slot 44. The clip 48 is preferably, but optionally a spring steel strip of shaped metal fastened to the rear end 14 of the skid plate 10. A fastener passing through the clip 48 and into a hole in a land formed in the rear 14 can hold the clip, with such a hole and land shown in FIG. 3. The clip 48 has a flat base 50 which joins a curved portion the distal part of which forms a locking portion as it abuts the rear projection 46. The distal end 54 of the clip forms a tang or handle to engage a user's finger to move the clip locking portion 54 to disengage the clip and allow the rear projection 46 to be removed from the rear slot 44. Further, during insertion the rear pin 46 abuts the tang 54 at a downwardly inclined angle to move the tang 54 laterally out of the way so the pin 46 can readily enter the slot 44 without manually touching the clip 48. After the pin 46 passes the juncture of the tang 54 and the engaging portion 52, then the clip 43 resiliently urges the pin 46 toward the bottom of the slot 44. The clip 48 can be rotated 180° and function the same way.

Preferably a user need not manually engage the tang 54 to release the rear pin 46 from the rear yoke 34. A rear tab 56 extends rearward from rear 14. The rear tab 56 preferably, but optionally has an alignment indicator 58, such as a point, notch, hole or slot located in the same plane as the slot 18 and blade 20 so a user can align the alignment 58 with the groove 25 to help guide the saw during cutting. Such alignment indicators are known in the art. But the rear tab 56 is preferably large enough that a user can step on it and lift up on the saw, causing the rear pin 46 to overcome the retention force exerted by spring clip 48 in order to disengage the rear pin 46 from the yoke 34. The clip 48 thus provides releasable means for retaining the rear pin 46 in the rear slot 44 of rear yoke 34. Other releasable snap locks are known and can be used here, including over-centered locks. Other releasable locking mechanisms can also be used, including slidable locks.

The rear yoke 34 has a front projection 34a and a rear projection 34b (FIG. 10) with the space between them forming slot 44. The bottom of the slot is curved to accommodate rear pin 46 and is preferably semi-circular in shape of a radius slightly larger than that of the rear pin 46. The side of projection 34b forming the slot 44 is straight and preferably vertical. The opposing side of the slot 44 formed by projection 34a is inclined forward at an angle θ of about 2-10° from the vertical beginning at about the radius of the curved bottom of the slot 44, or slightly above that radius. The inclined side of slot 34a provides a wider opening to the slot 44 and makes it easier to insert the rear pin 46 into the slot.

By inclining the sick of the slot 44 formed by projection 34a forward, the pin 46 urges the skid plate 10 forward relative to the pin 44 and the saw, with the front pin 42 being held in a generally horizontal slot 38 to float in that front slot 38. Thus, the position of the skid plate 10 is determined by the sides of the rear slot 44 engaging the rear pin 36 while the front end of the skid plate floats in the horizontal slot 38. There is always some risk the front pin 42 can hit the end of the front slot 38 before the rear pin 46 is positioned in the bottom of slot 44, and if only a slight interference is caused it will be accommodated by movement of the pistons 32, 36 and pins 42, 46, but it will result in a snug engagement of the front pin 42 with the front end of front slot 38. That will result in little misalignment of the skid plate 10 relative to the mounting portions 32, 36 of the saw.

If it were reversed so that the side of the slot 44 formed by the rear projection 34b was inclined rearward to form a wider opening of the slot 44 (FIG. 6), then when the rear pin 46 hit the yoke 34 and moves toward the bottom of slot 44 the pin 46 will push the skid plate 10 rearward but the front end of the skid plate would still float or be accommodated by the permissible movement allowed from horizontal slot 38. But there would be slightly more permissible movement between the front pin 42 and the front slot 38 and thus slightly more possible misalignment of the skid plate 10 relative to the mounting portions 32, 36 and relative to the saw. The clip 48 provides a spring force to resiliently urge the rear pin 46 into the rear slot 44 and if the front slot 38 is not long enough, the front pin 42 is also resiliently urged against the front end of front slot 38.

The upward opening slot 44 in the rear yokes 34 cooperates with the clip 48 to provide a means for releasably fastening the rear of the skid plate 10 to the saw. This releasable connection is believed to be easier to achieve than the prior art which inserted a pin horizontally through aligned holes in one or two yokes to mate with a close-tolerance hole through the rear piston 36. The rear pin 46 snaps into the slot 44 and is resiliently held there by the resilient clip(s) 48. The connection is also believed to be easier to release than the prior art connections as the pin 46 is not believed to adhere to the slot 44 and rear yoke 34 during use. Further, the finger or foot activated disengagement of the clip(s) 48 is believed to be considerably easier than the prior art disconnection of a curved spring from opposing ends of the fastening pin. Moreover, because the rear yoke 34 and slot 44 are cast along with the skid plate 10, the location and alignment of the skid plate relative to the mounting slot 44 are believed to be cheaper to make while more accurate. The prior art required not only making a rear yoke accurately, but required aligning it to a flexible platform on a strip of metal and then fastening it to the strip of metal without shifting position. The one-piece cast skid plate 10 provides more consistently located surfaces, and the casting can be more accurately machined, ground or cut to further increase the accurate location of the mounting surfaces (e.g., slots 38, 44) relative to other features of the cast skid plate 10.

Referring to FIGS. 1, 3, 4 and 6, the leading end 12 of the cast skid plate 10 is preferably, but optionally, angled relative to the direction of travel along groove 25 rather than perpendicular to the groove and to the direction of travel as in the prior art. This angled leading end of the skid plate which is in contact with the concrete surface is referred to as angled leading end 60. Preferably, but optionally, two angled ends 60, 62 are used to form a V-shape on the bottom surface 24 of front end 12 of the skid plate 10, with the apex of the V shaped end located to align with the groove 25 cut in the concrete. Thus, the intersection of angled ends 60, 62 is preferably in the plane containing cutting blade 20. That location also usually corresponds with the center of the skid plate 10 along which the longitudinal axis 64 of the skid plate 10 extends.

The angled front end helps the skid plate to avoid running over concrete that is removed during cutting. The blade 20 preferably rotates in an up-cut direction and if the concrete debris removed to form the cut groove 25 get in front of the skid plate then the skid plate 10 can ride over the debris. That can not only push the concrete debris into the concrete surface 22 and damage the finish on the surface, but the debris can tilt the skid plate causing the blade 20 to cut and weaken or widen the slot 18 in the skid plate, or it can tilt the saw and rotating blade 20 causing raveling of the cut groove 25. The inclined angle of ends 60 and/or 62 on the front end 12 urges any concrete debris to one side of the skid plate. A single inclined end 60 could be used, with the incline being constant (i.e., straight) or variable (i.e., curved). But a single inclined end could have to move concrete debris across the entire width of the skid plate, whereas two inclined ends 60, 60 forming a V-shaped end centered on the middle of the skid plate, need only move debris along half the width of the skid plate 10. Thus, two inclined ends 60, 62 are preferred. The angle of inclination will vary, but is advantageously about 100° or more measured on either side of the longitudinal axis 64 of the skid plate, and preferably about 110-40°.

The front end 12 is also preferably, but optionally inclined relative to the concrete surface 22 so that a portion of the front end 12 extends in front of and over the angled end(s) 60, 62, to form one, and preferably two inclined surfaces 66, 68. The inclined surfaces 66, 68 are inclined from the leading end of the front end 12 toward the bottom surface 24 of the skid plate 10. While it might appear that inclined surfaces 66, 68 would make it easier for the skid plate 10 to ride over concrete debris, it is believed that inclining the surfaces 66, 68 toward the concrete surface 22 and toward the bottom 24 will cause the larger concrete debris to roll aside easier or to break up easier and move aside easier.

The front ends 60, 62 and inclined surfaces 66, 68 are integrally cast with the skid plate 10. As desired, further grinding or machining or cutting of the cast skid plate can more accurately define these ends 60, 62 and inclined surfaces 66, 68. Likewise, the tunnel, groove or slot 23 is also integrally cast with the skid plate 10, but could be further defined by grinding, cutting or machining if desired.

The front and rear ends 12, 14 are advantageously solid in order to provide increased stiffness. But they could be made of a rib-stiffened structure which would still be suitable for even metal casting. A high stiffness is desired in order to avoid undesirable flexing and to help maintain the bottom 24 of skid plate 10 in contact with and supporting the concrete surface 22 during cutting. Support is especially important at the location where the up-cutting edge of the blade 20 leaves the concrete surface 22. Insufficient support causes raveling of the cut groove, as shown by undesirable spalling and roughness adjacent the cut. The skid plate 10 can be cast with a pre-selected flexibility and thus avoid the cost, complexity and variability in the prior art strip-metal skid plates.

Advantageously the cast skid plate 10 is cast with a slight bow in a direction selected to offset the bowing caused when the weight of the saw is placed on one or both of the mounting yokes 30, 34. When the weight of the saw presses the skid plate 10 against the concrete surface 22, then the skid plate bottom 24 is flat against the concrete surface. This cast-in curvature generally causes the bottom portion 24 to bow convexly usually about an axis parallel to rotational axis 21, but it could vary with the mounting configuration of the saw, and could cause the bottom portion 24 to be concave. The curvature usually results in the middle of the skid middle portion 18 being less than about 0.25 inches (about 63 mm) from the distal ends 12, 14, and more often less than about ⅛ of an inch less. Depending on the particular design of the skid plate the stiffness can vary and thus the amount of curvature that is cast into the bottom 24 will vary. Longer skid plates 10 accommodate larger cutting blades 20, and the amount of desired flexibility can vary. But for a given weight of saw and a given configuration of skid plate 10, the deformation of the skid plate 10 can be predetermined, and the appropriate curve can be cast in the bottom surface 24 of skid plate 10. Die cast aluminum is believed suitable for achieving tolerances of 0.002-0.003 inches. If further accuracy is desired beyond the tolerances and accuracy achieved by the casting method employed, then the bottom surface can be further machined, cut or ground to achieve a desired accuracy. If a softer metal is used like aluminum, the surface is preferably anodized or otherwise hardened or coated with a harder material to better resist abrasion from the concrete surface 22 during cutting.

Referring to FIGS. 2-3 and 6-7, the stiffness of the skid plate 10 can be varied as desired either along the longitudinal axis 64, or laterally or perpendicular to that axis in a plane parallel to the bottom 24. The particular configuration will vary with the material used to cast the skid plate and the size of blade 20 and the weight of the saw. The ends 12, 14 are relatively rigid to avoid localized deformation where the yokes 30, 34 transfer the weight of the saw to the skid plate 10. A central stiffening rib 70 runs along the longitudinal axis 64 of the skid plate 10 with the blade slot 18 being cut or formed in this rib. The front end 12 preferably, but optionally has a boss 66 (FIG. 2) extending toward the trailing end and preferably ending before the leading end of the slot 18. The boss 66 stiffens and stabilizes the skid plate 10 adjacent the leading end of the slot 18 where the up-cutting blade exits the concrete. The boss 66 is preferably, but optionally, angled so concrete debris removed by the blade 20 are urged toward either side of the skid plate 10.

Opposing side ribs 72, 74 extend along each opposing side of the skid plate parallel to the central rib 72 and the longitudinal axis 64. The ribs 72, 74 have a constant height along their length, except immediately adjacent the front end 12 as discussed later. The side ribs 72, 74 preferably, but optionally, help reduce torsion and bending, especially when coupled to the stiff ends 12, 14. A shallow concave groove which is aligned with the longitudinal axis 64 extends on either side of the center rib 70, between the center rib 70 and each adjacent side rib 72 and 74. The concave groove reduces material used to cast the skid plate 10, and thus reduces cost while providing the desired stiffness. The concave grooves also collect concrete debris removed by the blade 20 when the cut groove 25 is formed.

The side ribs 72, 74 preferably extend continuously from the front end 12 to the rear end 14 and join those ends. At the front end 12, the side ribs 72, 74 preferably, but optionally increase in height to form a pair of side shields 76, on each side. The side shields help prevent concrete debris from falling off the skid plate at the front where there is a greater possibility of being run over by the skid plate.

The trailing end 14 could have these side shields 76, but advantageously does not have them as it is desirable for the concrete debris to fall off the trailing end of the skid plate. Thus, it is advantageous to have the side ribs 72, 74 slightly lower toward the trailing end 14. Further, one or more recesses 78 are preferably, but optionally formed in the rear 14 of the skid plate to accumulate concrete debris.

The concrete saw encloses the cutting blade 20 in a blade housing 76 (FIG. 1) and often also has a splash shield at the end of the cutting blade 20 where the saw blade exits the concrete and sometimes also at the end of the cutting blade where the blade enters the concrete. The splash shield(s) help prevent concrete debris from being thrown by the cutting blade. When an up-cutting rotation is used on blade 20 the splash shield prevents concrete from being thrown in front of the skid plate where it could be run over by the skid plate. The front 12 and rear 14 of the skid plate 10 are configured to accommodate the splash shields. The splash shields are typically located within an inch or less of the ends of the cutting blade 20, and the front end 12 must thus end before it hits the splash shield. The same applies to the rear end 14 if a rear splash shield is used. Further, the splash shield may move toward and away from the concrete as the resiliently mounted pistons 32, 36 allow the cutting blade to move relative to the concrete surface 22. Thus, the height of the middle portion 16 of the skid plate and the height of the ends 12, 14 must accommodate the potential motion of the shield.

The skid plate 10 is preferably cast of metal, such as zinc, aluminum or other alloys. A cast aluminum alloy, 380 series, with a hard anodized coating is believed preferable. Die casting is believed suitable, but sand casting, metal injection, investment casting, powdered metal, centrifugal casting or rotary casting are also believed usable and all are referred to herein as "casting." A forged metal skid plate is also believed suitable, and the skid plate can be machined out of a block of material, preferably metal. The specific casting method used will vary with the tolerances desired and will likely change with improvements in casting technology. These casting metals are softer than the strip steel previously used, and thus the skid plates 10 are usually much thicker in order to provide the desired stiffness and wear resistance. A thickness of about ¼ to ⅜ inches at the center rib 70 is believed suitable when the skid plate 10 is made of aluminum. The thickness used will vary with the materials used and with the wear life that is sought to be achieved.

It is believed to be possible to mill the skid plate 10 out of a billet of steel and then optionally heat treat the steel or harden the bottom surface 24 to achieve a hardened, steel skid plate having the features described herein. This is not as desirable because of the difficulty and cost in machining the steel. The same machining could be done with a billet of metal other than steel, such as aluminum, with a hardening formed on the bottom surface 24.

The skid plate 10 could be cast of iron based alloys. The iron based alloys are less desirable as they melt at higher temperatures, are heavier, and are more difficult and expensive to cast. But preferably the skid plate 10 is cast of a metal the dominant portion of which is other than iron.

It is also believed that polymers could be used to cast the skid plate 10, especially high density polymers such as high density polyurethane, glass filled plastics or carbon fibers. Polyacrylate is also believed suitable. Polymers are not believed to be as desirable as metal because of potential excessive wear at the up-cutting edge of the blade, and because the harder concrete debris can embed in the softer polymers and thus be dragged along the concrete surface by the skid plate to scratch the surface.

Polymer skid plates with metal inserts at the location of the up-cutting edge of the blade 20 are believed suitable. The inserts preferably extend to the surface abutting the concrete and may extend to an upper surface of the polymer, or may be embedded in the polymer. Further, a polymer could be cast over a thin steel skid plate to add further thickness and support and to further define the shape of the skid plate 10. The harder metal skid plate would be located to abut the concrete. The metal skid plate preferably has tangs or protrusions embedded in the skid plate so the metal is not removable, but the metal could be removably fastened to the skid plate. Removable connections are shown in U.S. Pat. No. 6,736,126, the complete contents of which are incorporated herein by reference. In that patent a polymer sheet is an overlay on a metal skid plate and the polymer abuts the concrete. While that configuration is usable with the present embodiments, preferably a metal sheet overlays a polymer base which is connected to the saw, with the polymer base connected to the metal skid plate using the embodiments of that patent.

Figure 11:
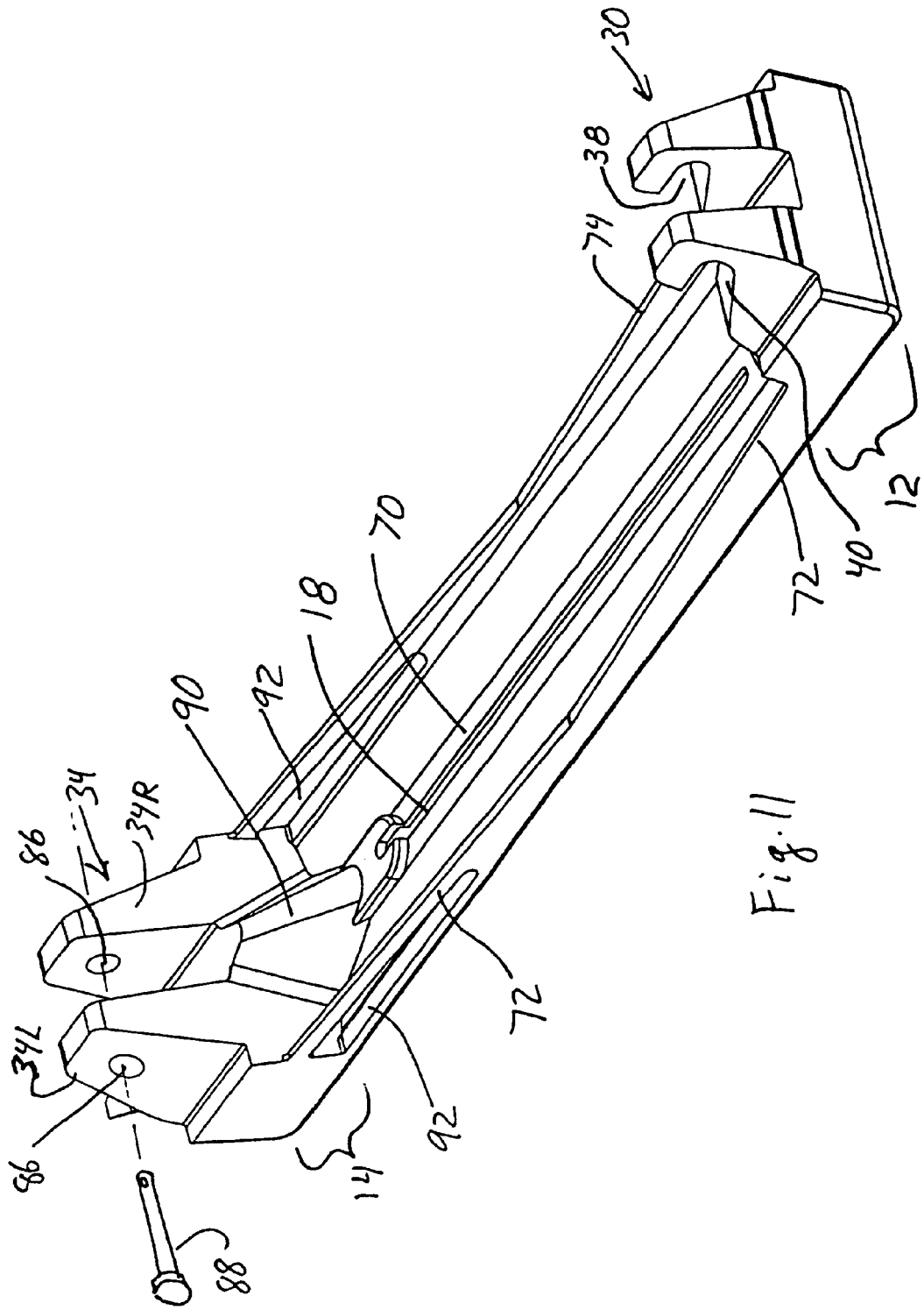
FIG. 11 is a perspective view of a further embodiment of the skid plate of FIG. 1.

Referring to FIG. 11, a further embodiment is shown. In this embodiment the front yoke 30 is as previously described but the rear yoke 34 lacks the slot 40 (FIG. 2) and instead has a generally horizontal hole 86 through each of the yokes 34, with the hole sized to receive a pin 88 which extends through mating holes in the rear piston 36. This is the traditional pinned connection used in the prior art, and has the disadvantage of difficulties in removing and reinserting the pin 88. A C-clip spring (not shown) fastens to opposing ends of the pin to prevent it from falling out of the piston.

The rear end 14 has a boss 90 extending forward and ending shortly before the trailing end of slot 18. This provides localized stiffness at the center of the skid plate, and that is especially useful if the cutting blade 20 exits at the trailing end of the slot 18, but the boss 90 could be used even if that were not the cast. The boss is angled and inclined so that it urges concrete debris on the skid plate toward either side of the skid plate.

In this embodiment, the side ribs 72, 74 are not of uniform height as the front and rear ends of the ribs are higher and taper to a lower rib height at about the middle of the length of the skid plate 10. This provides more torsional movement of the skid plate and allows bending toward the middle of the skid plate. The trailing end of the side ribs 72, 74 preferably, but optionally have openings 92 formed in them in order to allow concrete debris to more easily fall of the skid plate 10. The central rib 70 is less pronounced in this embodiment and thus not as high or thick as in the first embodiment. But the exact height of central rib 70, and other parts of the skid plate 10, will vary with the desired stiffness and length of the skid plate.

The front end 12 has a generally flat end perpendicular to the concrete surface 22 and perpendicular to the slot 18 in the skid plate. Other than those differences, the front end 12, and the other parts of the skid plate 10, are as described in the previous embodiment.

The slot 18 is within about ⅛ of an inch of the sides of the cutting blade 20, preferably along the entire length of the blade, advantageously along a majority of the length of the blade, and minimally along the sides of the cutting segments where the blade leaves the concrete surface. Closer spacing between the sides of the slot 18 and the adjacent sides of the cutting blade and the cutting segments on the cutting blade are preferred, including spacings of 1/16 inch and less. The close spacing reduces raveling that occurs when the concrete surface 22 is cut before the surface has reached its typical rock-like hardness. What constitutes acceptable raveling can vary, but as used herein acceptable raveling is that which is less than would occur with a down-cut, water lubricated saw cutting the next day on the same concrete surface.

The leading end of the slot 18 is preferably about ¼ of an inch from the cutting segments but the blade 20 moves relative to the concrete surface 22 during cutting, so the distance between the leading end of the skid plate and the cutting blade will vary. Details are found in U.S. Pat. No. 4,769,201, the complete contents of which are incorporated herein by reference.

The slot 18 is preferably cast into the skid plate 10. But depending on the material used to make the middle portion 16 the slot could be cut by the blade 20. Indeed, the skid plate could be cast without slot 18 and the user could plunge the cutting blade through the middle portion 16 to form the slot 18. This is possible because the concrete cutting blades 20 are so durable, but using the cutting blade to form the slot 18 is undesirable if the skid plate is a ferrous based alloy because of the resulting wear on the cutting blade in forming the cut. If the skid plate is of a material other than steel or an iron based alloy then it is more practical to have the user form the slot 18 by plunging the blade 20 through the middle portion 16. Alternatively, a post casting step of manufacturing could include mounting the cast skid plate on a fixture and cutting the groove 18 in a middle portion 16 that was cast without the slot, by plunging a cutting blade through the skid plate to form the slot. This slot formation could be performed by the user, but is less desirable if the skid plate 10 is formed of a ferrous based material because it will cause wear on the concrete cutting blade.

The skid plate 10 is shown with two mounting yokes 30, 34 and extending along the entire length of the blade 20. A skid plate made of stamped steel strip had been previously used which mounted only at the front of the saw and extended about half the length of the cutting blade 20. That configuration did not work nearly as well as the skid plate with two mounting portions. A cast skid plate 10 having only one mount 30, or 34 is nevertheless, believed suitable for use, but less preferable. A cast skid plate with only one mounting portion is believed to have advantages in performance, accuracy of manufacture, ease of manufacturing and cost above and beyond those of the prior art bent-metal skid plates.

Figure 12:
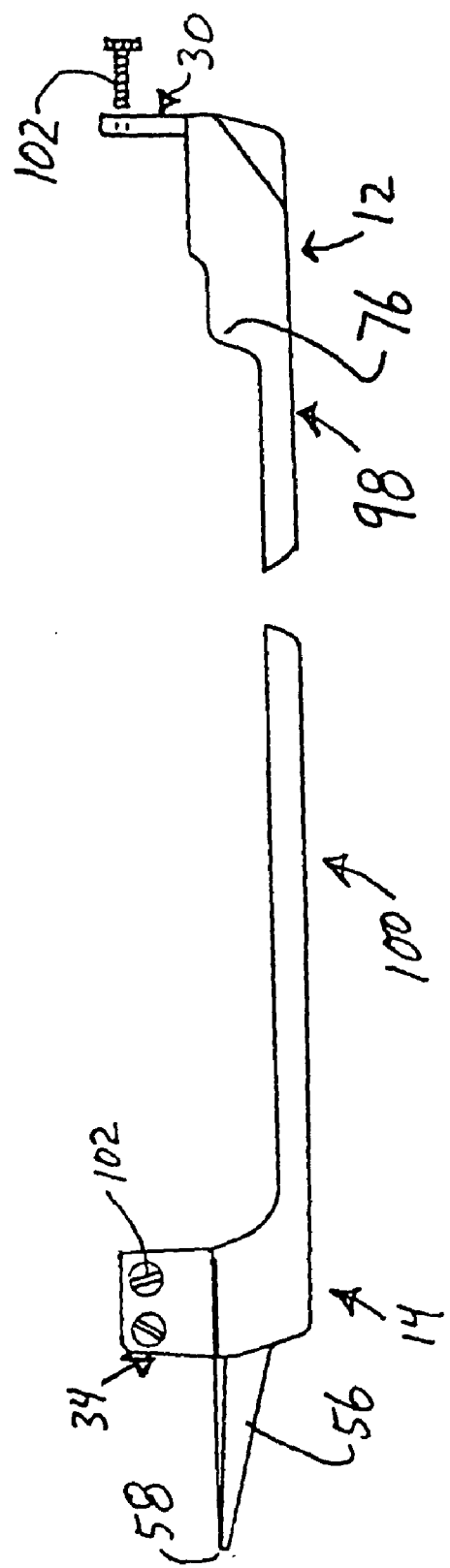
FIG. 12 is a side view of a further embodiment of a one or two-part skid plate.

Further, referring to FIG. 12, it is believed possible to use a skid plate 18 cast of two parts, a front and rear segment 98, 100, respectively, each segment having only one mounting yoke 30, 34 and each segment extending for less than the full length of the cutting blade 20 measured along the concrete surface 22. Only the front segment 98 could be used, but is less desirable than using both segments 98 and 100. The rear segment 100 would be used by itself only if the blade 20 exited the concrete within the slot contained in the rear segment 100 and then only it was the leading end which initially cut the groove in the concrete. Preferably the front skid plate segment extends from about ¼ to ½ the length of the blade 20 measured at the concrete surface 22. But the relative proportions of each segment 98, 100 of the two-piece skid plate 10 can vary. Preferably each skid plate segment 98, 100 has a leading end inclined away from the concrete in order to avoid digging into the concrete surface 22, and a trailing end that is also inclined away from the concrete. Inclined surfaces that are curved are preferred. A leading end that is also angled relative to the direction of travel, like angles 60, 62, are also preferred on each segment 98, 100. Because the slot 18 adjacent the up-cutting edge of the blade 20 wears fastest, this partial-length skid plate offers the possibility of physically replacing an entire portion of the skid plate 10 which is worn and reusing the portion which is not completely unsuitable for use.

The skid plate portions 98, 100 can be fastened to the saw by passing two pins or threaded fasteners 102 through the mounting portions 30, 34 into a mating portion of the saw. For the front portion 98, the front mounting portion can be modified to form a vertical flange which is bolted to the saw with two bolts. The same mounting could be used on the rear portion 100. Alternatively, a bracket could be placed on front and rear pistons 32, 36 to allow two pins or fasteners to fasten to the movable pistons, as shown on the rear portion 100. The prior art includes a partial skid plate made of bent, slotted sheet metal that was bolted to the front of a saw using two bolts. The cast skid plate parts 98, 100 are believed to be more accurately formed to the desired shape than these prior art bent strips of metal.

Referring to FIGS. 13-14, a further embodiment is shown which uses a single connection to the saw. The skid plate 10 has only the front segment 98 with the front 12 having the angled surfaces 60, 62, but with the middle portion 16 ending rather than being connected to end 14. The slot 18 extends through the middle portion 16, with a tunnel 23 formed in the lower surface 24. This embodiment of the skid plate 10 has a single connection to the saw, through the front mounting shaft or piston 32 in cooperation with the front yoke 30, each of which are modified from the prior embodiments.

The front yoke 30 has a left and right yoke 30L, 30R each of which has an aligned hole 104 therethrough through which a shaft of a snap pin 106 removably extends. The snap pin 106 has a spring lock 108 which is permanently fastened to one end of the snap pin and releasably fastened to the opposing end of the snap pin to releasably lock the snap pin 106 to the skid plate and saw during use, as described later.

Between the left and right yokes 30L, 30R the front portion 12 has a recess into which the distal end of the front piston 32 fits. In this recess a resilient member 110 is placed. The resilient member 110 is shown as a bent leaf spring having a first end fastened to the front mount 12 and having the opposing, second end bent generally into a C-shape relative to the first end. The second end preferably extends at an angle of about 45° relative to the horizontal. A flat strip of metal is believed suitable for the resilient member 110, but other types of springs and resilient members could be used, including coil springs, torsion springs, resilient elastomeric materials or rubber.

The distal end of the front mounting portion, shown as piston shaft 32, has a hole 112 sized and aligned to receive the shaft of the snap pin 106 passing through the front mounting yokes 30. The distal end of the front mount 32 abuts the resilient member 110 causing the skid plate 10 to rotate toward the concrete surface 22 during cutting. The resilient member 110 helps maintain the bottom surface 24 of the skid plate against the concrete during cutting in order to reduce or prevent raveling.

To limit the rotation of the skid plate 10 relative to the saw, a portion of the skid plate abuts a portion of the saw. This can be achieved various ways, including fastening a flexible member to both the saw and skid plate to limit the relative rotation of the skid plate about pin 106. But preferably a portion of the skid plate 10 abuts the front mount 32, or vice versa. Advantageously, but optionally, the distal end of shaft 32 has an outwardly extending protrusion 114, which can take various forms such as a boss, a post, a flange, etc, but which preferably comprises ridge 114 located to engage the distal or top end of mounting yokes 30 or some other projection extending from the skid plate 10. The ridge 114 is shown as formed by flats 116 on the cylindrically shaped distal end of the front piston 32, which leave a portion of the cylindrical piston 32 extending outward from the flats to form a ridge 114 on each opposing side of the front piston 32. The ridges 114 are located relative to the top of the yokes 30 so that as the skid plate 10 pivots about the shaft of snap pin 106, the ridges 114 will hit the tops of the yokes 30 to limit the rotation.

Figure 15:
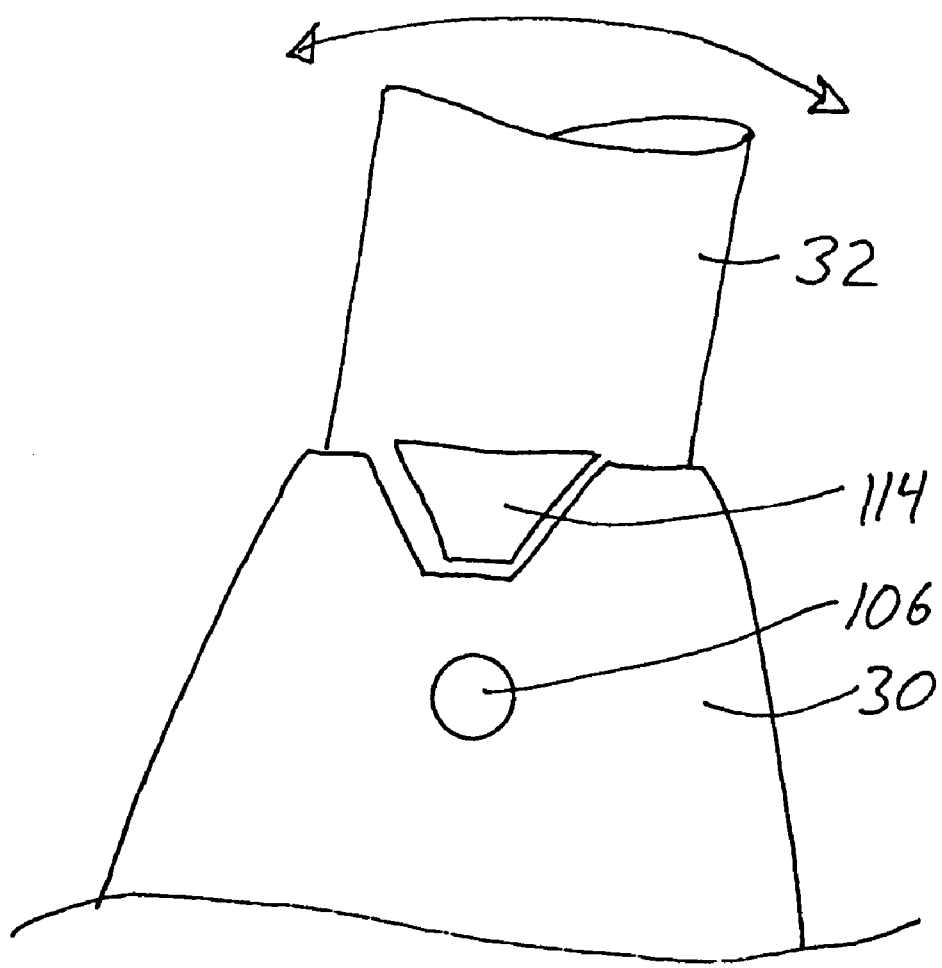
FIG. 15 is a partial view of a front mount with a motion limit stop.

Alternatively, the recess in the front end 12 which is located between the yokes 30L and 30R could have a front ridge sized to hit the distal end of the shaft 32 to limit the rotation of the skid plate 10 about shaft 30, or a post or protrusion on the end of the shaft 32 could hit a portion of the front end 12 to limit motion of the skid plate. Likewise, referring to FIG. 15, a protrusion 114 on opposing sides of the shaft 32 could abut shaped ends of the yokes 30L and 30R to limit rotation. Various other ways to limit the rotation will be apparent to one skilled in the art given the present disclosure.

In use, the distal end of front mount 32 presses against the resilient member or spring 110 urges causing the spring to urge the skid plate 10 toward and against the concrete while the blade 20 extends through the slot 18 to cut the concrete surface. The spring is selected to provide sufficient force to maintain the skid plate against the concrete during cutting so as to reduce, and preferably to prevent raveling. The restraint system, such as the motion limit formed when ridge 114 hits the top of the mounting yokes 30, restrains movement of the skid plate so that when the blade and skid plate are withdrawn out of the concrete, the lower end of the skid plate does no drag on the concrete surface 22 so as to mark that surface. The snapper pin 106 allows for removal and replacement of the skid plate 10. The snapper pin 106 and its releasable spring lock 108 could take various forms, including pins with spring loaded detents.

The skid plate 10 preferably extends at least past the cutting segments of the up-cutting portion of the cutting blade, and can extend for any length of the blade. Preferably the skid plate 10 extends for the entire length of the blade 20 measured along the concrete surface 22 (FIG. 1). The skid plate 10 is shown mounted to the leading end of the saw through the front mount 32, and then extending rearward. But it could be revised for mounting at the trailing end to rear mount 36, and extend forward. Whichever orientation is used, the leading end is preferably rounded or inclined in order to avoid digging into the concrete surface 22.

Referring to FIGS. 16-17, a further embodiment is shown in which a plate 120 is releasably fastened to the cast skid plate 10. The plate 120 comprises a sheet of material having a flat lower surface to smoothly abut the concrete surface 22 (FIG. 1) during cutting. The plate 120 can have various shapes, but preferably is shaped to conform to the bottom surface 24 (FIG. 4) of the skid plate 10, and the shape of the bottom can vary. The depicted plate 120 preferably, but optionally has two inclined leading ends 60a, 62a, and a slot 18a. The slot 18a is shown ending in the plate 120. The slot can be preformed in the plate 120, or it can be cut by the cutting blade 20 (FIG. 8) after the plate is fastened to the skid plate 10. The plate has an upward-extending flange 122 along at least a portion of one side of the skid plate 10, with mounting tabs 124 at opposing ends. Preferably, but optionally, the tabs which are located to correspond with fasteners 126 extending from the skid plate 10. The front and rear portions 12, 14 are sufficiently thick that a threaded hole can be formed to accommodate a threaded fastener 126, and thus the tabs 124 preferably align with holes and fasteners 126 placed in the front and rear portions 12, 14. The fasteners 126 extend through holes in the tabs 124, with threaded knobs 128 fastening the tabs 124 and plate 120 to the skid plate 10. The plate 120 can be cast of metal or other material, or extruded from a polymer material, or punched and formed from strip metal such as steel or aluminum.

In use, the plate 120 is releasably fastened to the skid plate 10 by manually fastening the knobs 128 and fasteners 126 to the plate 120 and skid plate 10. The skid plate 10 provides support for the plate to prevent it from deforming and allowing raveling. The fasteners 126 and knobs 128 should cooperate with the tabs 124 sufficiently to hold the plate 120 flat against the bottom 24 of skid plate 10. If the plate 120 is angled relative to the skid plate 20 the cutting blade 20 may cut and widen the slot 13a, and that could increase raveling of the concrete surface 22 during cutting.

The plate 120 can be used to reduce wear of the skid plate 10, or it can be used after the slot 18 in skid plate 10 has become too wide to prevent raveling of the concrete during cutting. The flange 122 helps align and stiffen the plate 120, but could be omitted if desired. A flange on the opposing side of the plate 120 could be provided if desired, as could additional fasteners 126 and knobs 128. Further, one or both of the fasteners 126 could comprise pins and a different type of releasable lock could be used instead of the knob 128 (e.g., cotter keys, snap rings, etc.). If the slot 18a is preformed in the plate 120, it is preferably aligned and located to coincide with the slot 18 in skid plate 10, when mounted to the skid plate 10. The fasteners 126 preferably fasten to the ends 12, 14, but could fasten to the side ribs 72 and/or 74, or to one or more of the shields 76. As the skid plate 10 is cast rather than formed of strip metal, suitably strengthened bosses can be readily located to accommodate various types of fasteners 126.

Figure 18:
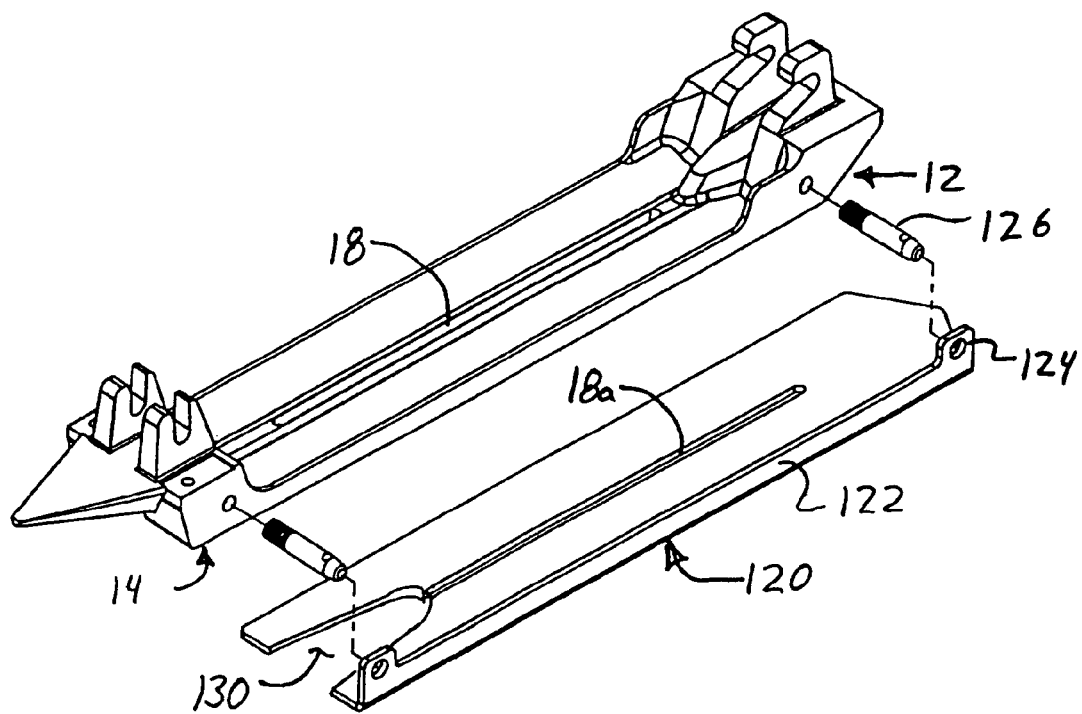
FIG. 18 is a further embodiment of the skid plate of FIG. 16.

Referring to FIGS. 16 and 18, the slot 18, 18a preferably extends to the trailing end of the skid plate 10 and the plate 120 in order to avoid having the plate 120 trowel over the cut groove. The slot 120 could be formed to extend until it opens onto the trailing end of the plate 120. Alternatively, as shown in FIG. 18, a shorter, and preferably wider rear slot 130 could be formed in the plate 120 and extend from the trailing end forward. If so, the plate 120 is preferably made without a pre-formed slot 18a. When the slot 18a is cut by a user plunging the blade 20 (FIG. 1) through the plate 120, the cut slot 18a joins the rear slot 130 to prevent troweling of the concrete. Having the blade 20 form the slot 18a in plate 20 reduces the required accuracy with which the plate 120 is aligned with the skid plate 10, as the slot 18a is preferably close to the cutting segments of the blade 20 during use. This rearwardly located slot 130 is usable with the various embodiments discussed herein.

Referring to FIGS. 19-21, a further embodiment is shown in which the plate 20 is as generally described above, but in which the fastener 126 takes the form of a pin with a spring loaded detent, as shown in FIG. 20. In this embodiment the fastener 126 has one end threaded to engage mating threads on the skid plate 10. The opposing end of the fastener has a spring loaded detent 132 adjacent a distal end that is tapered to better fit through mating holes in the tabs 124. The detent 132 extends through the mounting tab 124 and expands to prevent removal of the tab until the detent 132 is depressed. The spring loaded detents 132 are known in the art and not described in detail. But the detents 132 allow quick removal and replacement of the plate 120, while the pins 126 are believed suitable to provide the alignment of the plate 120 with the skid plate 10.

Referring to FIGS. 22-23, a further embodiment is shown for removably fastening a version of plate 120 to the skid plate. The plate 120 has a flange 122 along each opposing longitudinal side of the plate with the flanges spaced far enough apart that a skid plate 10 can fit between them. Preferably there is a snug fit between the skid plate and the flanges 122 to restrain movement of the plate 120. The opposing flanges have a plurality of tab 124 on each flange. The tabs 124 on one flange 122 are aligned with the tabs on the opposing flange, so that a threaded fastener 126 can pass through aligned holes in the opposing tabs. The fastener 126 preferably has an enlarged head on one end, and threads engaging a nut on the opposing end. The tabs 124 are located adjacent the ends 12, 14 so that when the fastener passes through the holes in the tabs, the fasteners abut the front and rear ends 12, 14 to keep the plate 120 from substantial movement along the longitudinal axis 64. The rear fastener 126 pushes against the rear end 14 to push the plate 120 when the saw moves forward during cutting. The front fastener 126 pushes against the front end 12 when the saw is pulled backwards, in order to move the plate 120. Preferably the fasteners 126 are located relative to the skid plate 10 so that the plate 120 is snugly held against the skid plate to help prevent movement of the plate 120 relative to the skid plate 10.

The fasteners 126 cooperate with the plate 120 to encircle narrower portions of the skid plate 10 and hold the plate 120 so it moves with the skid plate to maintain sufficient alignment of the slots 18, 18a to support the concrete adjacent the cutting blade 20 and reduce or prevent raveling. The plate 120 preferably, but optionally, has a shape that matches the shape of the bottom 224 of the skid plate 10, and this is shown with inclined front ends 60a, 62a. Instead of threaded fasteners 126, detent pins, pins with spring clip fasteners, or other removable, elongated fasteners could be used. Further, the tabs could extend from the bottom plate 120 rather than forming a portion of the side flanges 122.

Further, the tabs 122 could be omitted and the two fasteners 126 could pass through a hole on the skid plate. For example, a boss could be formed on the upper surface of the skid plate with a hole in the boss through which one of the fasteners 126 extends. Two such bosses to hold a forward and rearward fastener 126 are believed sufficient.

To attach the plate 120, it is pressed against the bottom 24 of the skid plate 10 so the holes in the tabs 124 project above the side ribs 72, 74. The fasteners 126 are passed through a pair of aligned, opposing holes in the tabs 124 so they abut opposing ends 12, 14. To remove and replace the plate 120, the process is reversed. Some vertical movement between the plate 120 and skid plate 10 is permissible in the plane of the cutting blade 20, but any such movement is preferably kept small to enhance the protection against raveling.

Referring to FIGS. 24-25, a clip-on plate 120 is shown having at least one clip 136 on each opposing side of the plate 120. The clip 136 preferably comprises a portion of the plate 120 which is bent upwards and inwards to form a resilient member of sufficient length that a distal end of the clip can extend over a mating edge of the skid plate 10. The clips 136 are preferably located to extend over the side ribs 72, 74 adjacent the juncture of the side ribs with the ends 12, 14 so the clips 136 abut the ends 12, 14 to restrain longitudinal movement of the plate 120 relative to the skid plate 10. Engagement of the side ribs 72, 74 by the clips 136 restrains lateral movement of the plate 120 relative to the skid plate 10. Preferably the distal end of each clip 136 has an outwardly extending portion 138, such as a finger tab, sufficiently sized to allow a person's finger to engage the portion 138 and bend the clip 136 sufficiently to allow the engagement and disengagement of the clips 136 with the side ribs 72, 74. The clips 136 resiliently engage the skid plate 10 to allow easy attachment and detachment of the plate 120 on the skid plate. If desired, notches could be formed on the side ribs 72, 74, or other portions of the skid plate 10, specifically configured to engage the clips 136. Four clips 136 are shown, but the number, size and location can vary.

In this embodiment the plate 120 is shown with a square leading end rather than an inclined end. The particular shape will vary. Preferably the leading end is curved or inclined away from the concrete surface 22 (FIG. 1) to prevent marking the surface, or alternatively the plate 120 is made of material which will cause the leading end to soon take a curved or rounded shape.

To attach the plate 120, it is positioned along the bottom 24 of the skid plate 10 and the tabs 136 along one side are engaged with one of the side ribs 72, 74. The plate 120 is then rotated so the other clips 136 engage the opposing side rib 72, 74, with the clips 136 bending to allow the engagement. To disengage the plate 120, the finger tab 138 is used to bend the clip 136 away from the skid plate 10 and allow removal of the plate 120.

Referring to FIGS. 26-27, a further embodiment is shown in which the plate 120 has flanges 122 extending a substantial length of the plate 120, and preferably along the entire length. More than half is a substantial length. The flanges 122 have a distal end which is shaped to extend laterally over the side ribs 72, 74 to engage the ribs and hold the plate 120 to the skid plate. Preferably, but optionally, the distal ends of the flanges 122 have a C-shape to hook over the ribs 72, 74 and extend back toward the bottom of the plate 10. The side flanges 122 form resilient members which urge the distal ends of the flanges 122 into releasable engagement with the side ribs 72, 74. The flanges 122 preferably extend between the ends 12, 14 so that the distal ends of the flanges 122 abut the ends 12, 14 to limit longitudinal motion of the plate 120 relative to the skid plate 10. The flanges 122 are spaced apart so they abut the ribs 72, 74 and thus also limit the lateral movement of the plate 120 relative to the skid plate 10. The ribs 72, 74, or ends 12, 14 could be specially configured to engage a portion of the flange 74 and limit longitudinal motion between the parts.

In use, one of the flanges 122 is placed so its distal end engages one of the side ribs 72, 74, between the ends 12, 14. The plate 120 is then rotated and pressed so that the flanges 122 bend to allow the distal end of the un-engaged flange 122 to engage the other side rib 72, 74. The flanges 122 snap-lock the plate 120 to the skid plate. To remove the plate 120 from the skid plate 10, one or both of the flanges 122 are bent away from the side ribs 72, 74 and the plate is removed. If desired, one or more outwardly extending finger engaging protrusions or tabs 138 (as described in FIGS. 24-24) could be placed on the flanges 122 to make it easier to bend the flanges 122 and engage or disengage the plate 120 from the skid plate 10.

Referring to FIGS. 28-29, a further embodiment is shown in which a plate 120 is removably fastened to the bottom 24 of the skid plate 10 by a fastener 140. The plate 120 is shaped to conform to the shape of the bottom 24. A plurality of holes is formed through the plate 120 and fasteners 140 extend through the holes to fasten the plate 120 to the skid plate 10. Two fasteners 140 are shown, at opposing ends of the plate 120 and at opposing ends of the skid plate 10. The fasteners 140 are shown as screws, one engaging the front 12 and one engaging the rear 14 of the skid plate.

In the depicted embodiment the plate 120 has a slot 18a which ends internally to the plate 120 so the trailing end of the plate 120 trowels over the groove cut in the concrete surface, with one of the fasteners 140 being on the longitudinal axis 64 in which the slot 18a and blade 20 (FIG. 1) are located. It is preferable that the fastener 140 be located off the longitudinal axis 64 so that the groove 18a could be extended to the distal end of plate 120, as by the use of a partial slot 130 described in FIG. 18.

Referring to FIGS. 30-31, a further embodiment is shown in which an adhesive 143 is placed over at least a portion, and preferably over all of the upper surface of the plate 120. The adhesive 143 abuts the bottom 24 of the skid plate 10 to hold the parts together. A removable backing paper is preferably placed over the adhesive 140, to protect the adhesive during non-use. The backing paper is removed shortly before the plate 120 is fastened to the bottom of the skid plate. The plate 120 is pried off the skid plate 10 by using a screwdriver or putty knife inserted between the plate 120 and bottom 24.

Referring to FIGS. 32-33, a further embodiment is shown in which plate 120 has a resilient locking tab 142 extending therefrom to engage a mating recess in the skid plate 10. Preferably, there are front and rear locking tabs 142a, 142b, respectively. Further, the front locking tab 142a is preferably, but optionally, formed by upsetting material from the slot 18a so the tab 142a extends upward from the plate 120 and forms a resilient member with a distal end 144 shaped to hook over and engage a mating surface. The location and shape of the resilient locking member 142 and locking end 144 can vary to form a snap-lock releasably holding the parts together. Ideally, the locking tab 142a extends through slot 18 and the distal end 144 engages the upper surface of the skid plate 10 adjacent the leading end of the slot 18, either on one of the sides of the slot or on the leading end of the slot. The resilient locking tab 142a can be viewed as a resilient prong that engages the edges around a hole or slot through which the tab 142a extends in order to form a releasable snap-lock. Various configurations of such resilient snap-locks can be devised using the disclosure herein, including snap locks that extend through circular holes through the skid plate rather than extending through the slot 18.

The trailing locking tab 142b could have the same construction as the front locking tab 142a, but preferably the rear locking tab is a protrusion formed from upsetting material from the slot 18a into a shape that fits in the slot 18 and engages the trailing end of the slot 18. The front locking tab 142a releasably holds the plate 120 to the skid plate 10, while the rear locking tab 142b prevents the plate 120 from moving rearward along longitudinal axis 64. Both locking tabs 142a, 142b cooperate to prevent lateral movement of the plate 120 relative to the skid plate 10.

In use, the plate 120 is aligned with the skid plate 10 and the rear locking tab 142b is placed into and abutting the rear of slot 18 in the skid plate 10. The front locking tab 142a is then bent into the front of the slot 18 and the plate 120 is rotated so the front tab 142a passes through the slot 18 and the distal end 144 engages the upper surface of the skid plate. For removal, the distal end 144 is manually engaged with a user's finger and bent toward the distal end 14, to release the plate 120. Alternatively, the plate 120 could be manually pulled away from the skid plate 10 and thus manually overcome the retention force of the locking tab(s) 142 by pulling on the plate 120.

The various embodiments of FIGS. 16-33 provide means for removably fastening a plate 120 to the skid plate 10, through the use of various fasteners 126, 140 and releasable mechanisms 136, 141, 142. The plate is preferably, but optionally shaped to conform to the shape of the bottom 24 of the skid plate, but the shape can vary. The leading end is preferably curved or inclined away from the concrete surface 24 (FIG. 1) to prevent marking the surface. The edges of the plate 120 are often square edges, but they could also be curved away from the concrete surface, and could form short flanges that engage any or all of the various sides, ends and edges defining the bottom surface 24 of the skid plate, to better position the plate 120 relative to the skid plate 10 and to help reduce marking of the concrete surface during cutting.

The plate 120 can be injection molded of plastic, or bent into shape from sheet metal stock or coiled metal. Or the plate 120 could also be cast of metal, or formed of composites, or powdered metal or sintered metal, as could skid plate 10. The slot 18a can be formed in the plate 120, or cut into the plate by the first user of the plate shortly before cutting the concrete surface. The trailing slot 130 in plate 120 is preferably used with these various embodiments, but can be omitted.

Figure 4:
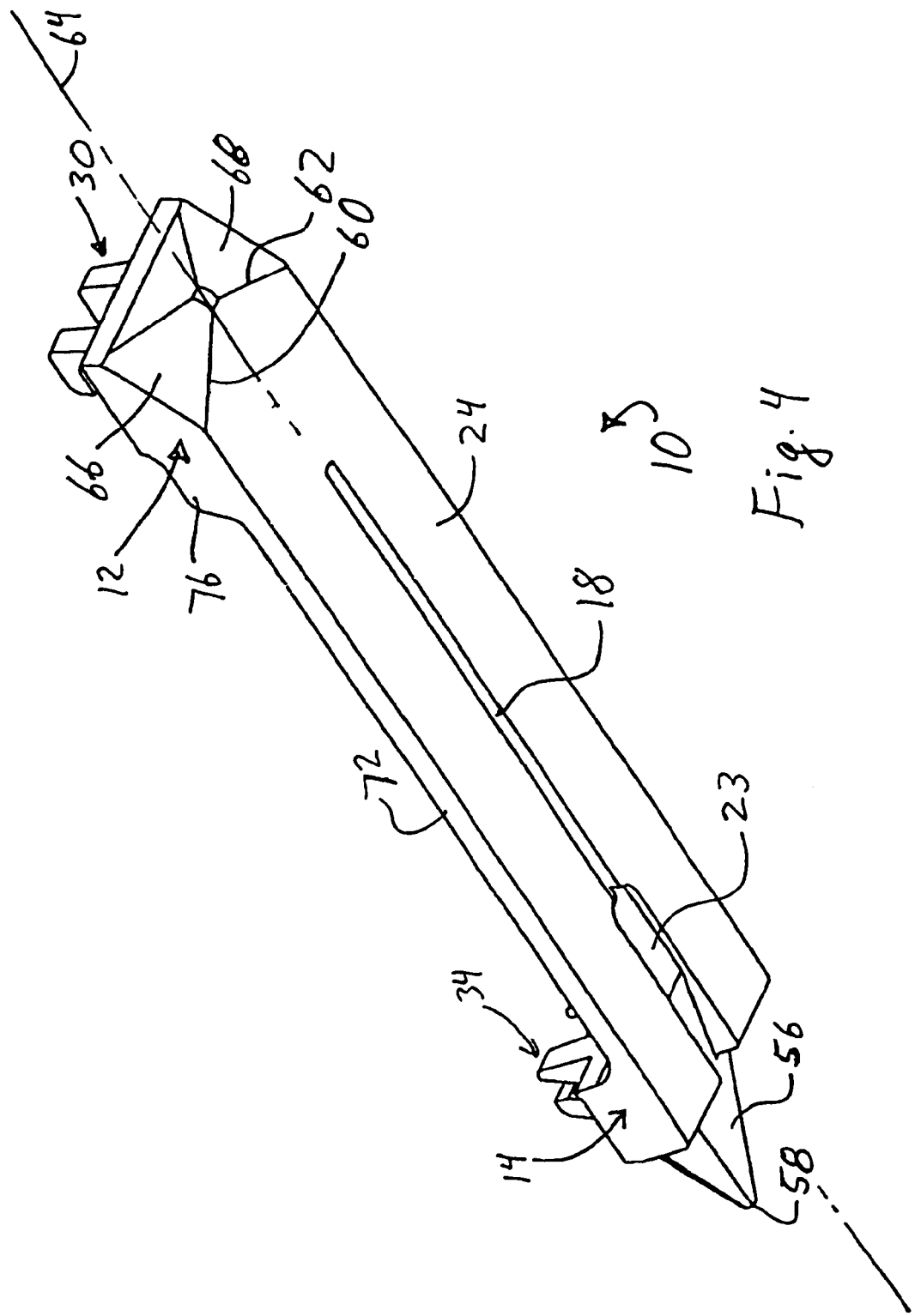
FIG. 4 is a perspective view of the bottom of the skid plate of FIG. 1.

A further advantage of the skid plate is seen in FIGS. 4 and 6. The pistons 32 are located on opposite ends of the cutting blade and extend toward the concrete surface. During cutting these pistons 32 push against opposing ends of the skid plate. The distal ends of these pistons 32 are fastened to the skid plate at a location that is vertically offset from the plane of the concrete, in part because of size and space limitations. The mounting yokes 30, 34 are likewise vertically offset from the middle or support portion 16 of the skid plate. In the prior art these mounting portions overhung the middle support portion 16, and that caused bending of the middle portion 16. In the present skid plate, the front and rear ends of the skid plate advantageously extend to the concrete surface below the pistons 32 so the skid plate is interposed between the concrete surface and the mounts 32 to the saw. Further, the front and rear ends 12, 14 of the skid plate preferably abut the concrete below the pistons 32, so the force from the pistons can pass directly through the front and rear ends 12, 14 and onto the concrete in order to greatly reduce, and preferably eliminate the bending of the skid plate middle portion 16. The ends 12, 14 are preferably configured to be large enough that the weight of the saw pushing on the ends does not mark the concrete.

By interposing the ends 12, 14 between the mounts to the saw and the concrete, the forces tending to bend and bow the middle portion 16 of the skid plate are significantly reduced. That reduction in bowing allows the use of less curvature in the skid plate to offset the bowing that occurs during use. By extending the ends 12, 14 in front or and behind each piston 32 a sufficient distance (depending on the mounting configuration), it is believed possible to effectively eliminate the bowing of the skid plate and thus remove the need to curve the skid plate to counteract any bowing. The configuration used to mount the skid plate to the saw, such as yokes 30, 34 allows variation in the location of the forces that tend to bend the skid plate.

But by making the front end 12 extend in front or behind the piston 32 a distance sufficient to effectively remove a bending moment on the skid plate, the ability to use a segmented or partial length skid plate is enhanced. Most of the wear on the skid plate occurs at the leading end of the skid plate where the leading end of the up-cutting saw blade exits the concrete surface. A segmented skid plate having a front portion that extends past that up-cutting edge of the cutting blade but not the entire length of the blade can reduce raveling, and can allow replacement of that front segment more often at a lower cost than replacing an entire, full length skid plate. A rear segment of the skid plate can support the concrete at the trailing end of the blade, and need not be replaced as often as the front segment.

While it is simpler to have the skid plate connect to the distal ends of pistons 32 and extend directly to the concrete surface directly below those distal ends, it is possible to cast the skid plate ends 12, 14 to form an inverted U shape that contacts the surface in front of and behind the location of the distal ends 32. A solid end 12, 14 is desired below the connections to the saw, such as yokes 30, 34, because it reduces the uncertainties of deformation of shaped parts.

Figure 5:
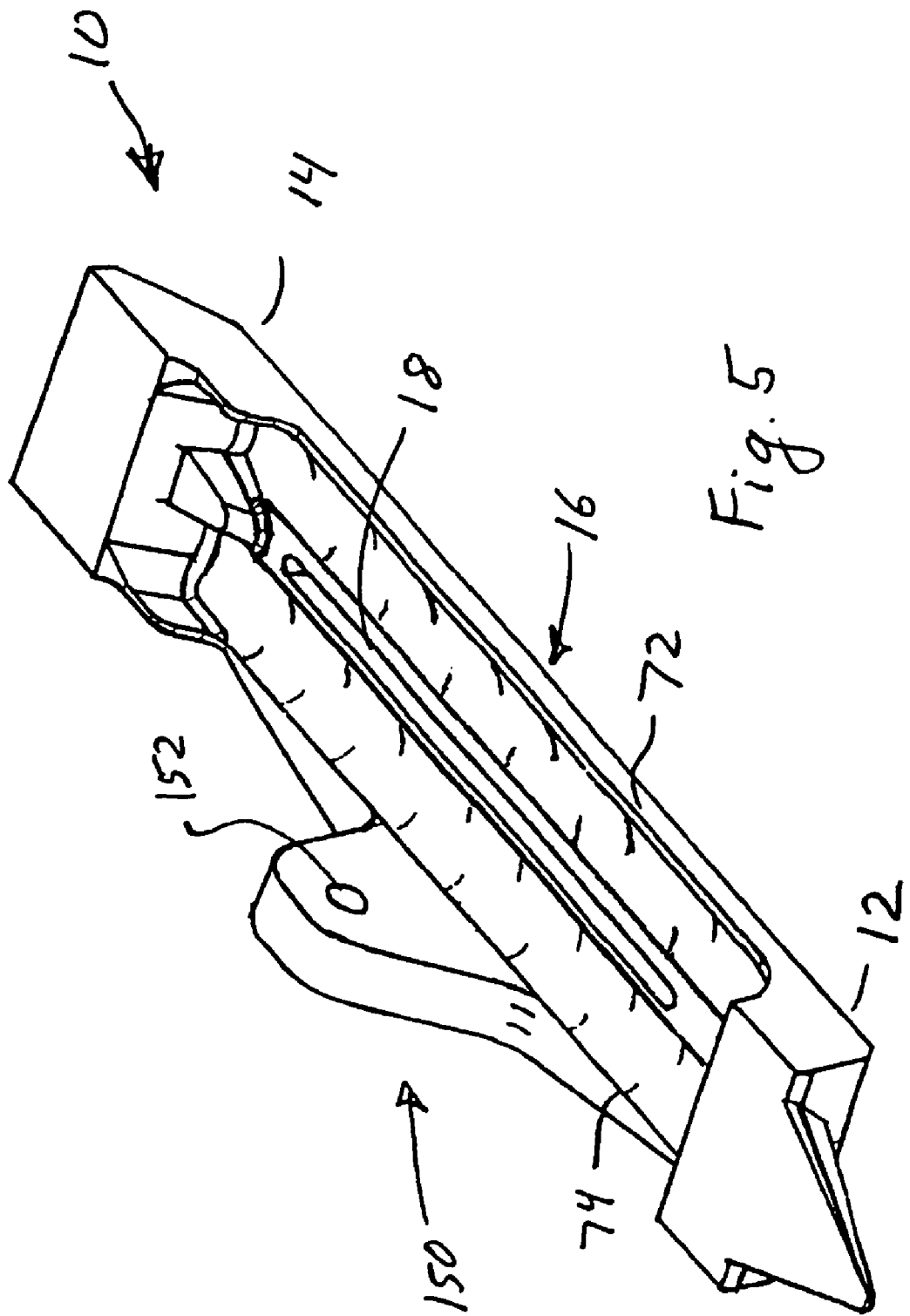
FIG. 5 is a perspective view of a further embodiment of a skid plate with a side mounting portion.

Referring to FIG. 5, a further embodiment is shown which uses a side mounting yoke 150 fastened to the skid plate 10. The side mounting yoke is shown with a flange extending toward the saw and fastened to the middle portion 14 of the skid plate 10. As shown, the mounting yoke 150 is braced to the front and rear portions 12, 14 of the skid plate. The side mounting yoke 150 can be mechanically or chemically (e.g., adhesives) fastened to at least one side of the skid plate 10, but is preferably molded or cast integrally with the skid plate. The side mounting yoke 150 preferably fastens to, and could form, one of the side ribs 72, 74 and extends away from the concrete surface 22 toward the saw. A hole 152 extends through the mounting yoke 150 so that a pinned connection can be used similar to that described in FIGS. 13-14. The description of that pinned connection is not repeated.

The use of a centrally located mounting yoke requires locating a movable piston at the location of the mounting yoke, or extending a mounting support between front and rear pistons 32, 36 to connect to the side mounting yoke 150. The side mounting yoke 150 is preferably located slightly forward of the center of gravity of the skid plate 10 so that the skid plate rotates about an axis through the hole 152, with the rear end 14 downward, when the skid plate is not in contact with the concrete surface. That helps prevent the front 12 from digging into the concrete surface as the skid plate is lowered toward the concrete surface 22. Further, it is undesirable to locate the mounting yoke 150 so the hole 152 is in line with the rotational axis of the cutting blade 20 because of the drive shaft rotating that cutting blade and because of the access needed to fasten the blade to the drive shaft. Thus, the yoke 150 is offset forward of the drive shaft rotating the blade 20, or is offset forward of the rotational axis of the cutting blade 20.

The side mounting yoke 150 allows the weight of the saw to be supported more toward the middle of the skid plate 10, and that reduces bowing of the ends 12, 14 relative to the concrete surface 22.

A single side mounting yoke 150 could be used, or two side mounting yokes could be used, one on each opposing side rib 72, 74. If two side mounting yokes 150 are used, the second one is preferably, but optionally, a mirror image of the yoke 150 shown in FIG. 5. This allows a single piston to be used if only one side mounting portion 150 is used. Alternatively, two pistons, one on each side of the cutting blade 20 could be used, each pinned to a separate side mount 150 on opposing sides of the cutting blade. Locating the mounting yoke 150 to only one side of the slot 18 can cause twisting of the skid plate 10 about the single side mount and fastening the saw to two side mounts can cause twisting of the skid plate 10 about the slit 18. But the offset is relatively small (0.5-2 inches) and the skid plate is relatively stiff along the axis needed to oppose that bending, in order to minimize the effects of deformation from the side offset.

The ability to eliminate the prior art truss used to curve the skid plate offers further advantages to the concrete saw. The truss extended generally parallel to the middle portion 16, but vertically offset toward the saw and away from the concrete. The presence of the truss limited the size of the flange which helps clamp or fasten the cutting blade 20 to a rotating arbor. By eliminating the truss the flange can be made larger and can extend closer to the middle portion 16 of the skid plate. This increased diameter support not only helps support the cutting segments of the blade 20 and make the blade more rigid, but it places a greater surface of the flange in contact with the metal core of the cutting blade and that increases conduction and helps keep the cutting blade cooler. A cooler cutting blade is useful because the metal core (over which the abrasive cutting segments are formed) can overheat and soften, leading to premature failure of blade or excessive wear of the cutting segments. The elimination of the truss by using the cast skid plate thus helps the blade 20 run cooler and presumably last longer, and it allows a stiffer support which typically means a straighter cut and less wobble of the blade 20. A concrete cutting blade with a mounting flange closer to the periphery than previously achievable is thus believed possible. During use the mounting flange comes close to hitting, but does not abut the skid plate, with the closeness being determined by the depth of cut of the groove 25 formed in the concrete.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of fastening the skid plate to the saw. Further, the various features of this invention can be used alone, or in varying combinations with each other and are not intended to be limited to the specific combination described herein. Thus, the invention is not to be limited by the illustrated embodiments but is to be defined by the following claims when read in the broadest reasonable manner to preserve the validity of the claims.

What is claimed is:

1. A skid plate for a concrete cutting saw, the saw having a rotating blade with sides and rotating about a rotational axis to cut a groove in a concrete surface during use of the saw, comprising:
   an elongated support portion having a longitudinal slot therein sized to fit within about ⅛ inch or less of the sides of the concrete cutting blade during use of the skid plate;
   a plate configured to abut a bottom of the elongate support portion and means for releasably fastening the plate to the elongate support portion
   wherein there are two mounting portions forming a front and rear mounting portion, one each at an opposing end of the elongated support portion, with the front mounting portion having a front mounting yoke, and the rear mounting portion having a rear yoke.

2. The skid plate of claim 1, further comprising a slot in the plate located to coincide with the slot in the elongate support portion.

3. The skid plate of claim 1, where the elongated portion and at least one mounting portions are cast of metal.

4. The skid plate of claim 1, where the elongated portion and at least one mounting portions are cast of a polymer.

5. The skid plate of claim 1, where the elongated portion and at least one mounting portions are cast of a metal the dominant portion of which is other than iron.

6. The skid plate of claim 1, wherein the skid plate has a leading and trailing end and the leading end of the skid plate is angled relative to the longitudinal slot.

7. The skid plate of claim 1, wherein the skid plate has a leading and trailing end and the leading end of the skid plate has a V shaped configuration in the plane of the elongated portion with the point of the V oriented away from a trailing end and toward the leading end.

8. The skid plate of claim 1, wherein one of the two mounting portions having a C-shaped mount forming a slot configured to receive between opposing legs of the C-shaped slot a pin that is generally parallel to the rotational axis, and the other one mounting portions having a generally vertical slot opening away from the support portion in a direction perpendicular to the support portion and configured to receive a pin that is parallel to the rotational axis.

9. The skid plate of claim 8, further comprising a lock mechanism adjacent the vertical slot to releasably hold the pin in the slot during use of the skid plate.

10. The skid plate of claim 1, wherein the support portion is formed by two separate parts each of which has one of the two mount portions, and each of which has a slot therein which slot extends along a portion of the cutting blade during use of the saw.

11. The skid plate of claim 1, wherein one of the two mounting portions is located to one side of the cutting blade and forward of the rotational axis of the cutting blade.

12. A skid plate for use on a concrete cutting saw having a cutting blade that rotates about a first axis and extends through a slot in the skid plate to cut a groove in a concrete surface along a second axis that is orthogonal to the first axis, the saw having front and rear mounts to fasten to the skid plate, the skid plate comprising: two saw mounting portions on the skid plate located to correspond to the front and rear saw mounts and an elongated support portion, and an elongated slot either cut into the support portion or integrally cast with the support portion, the slot sized relative to the cutting blade to support the concrete surface during cutting so it does not produce unacceptable raveling of the cut groove during use of the skid plate; and wherein a leading end of the skid plate has an angled end forming a V with the apex of the V facing forward and in the same plane as the slot.

13. The skid plate of claim 12, wherein the two mounting portions and support portion being integrally cast.

14. The skid plate of claim 13, wherein the elongated portion and mounting portions are cast of a metal the dominant portion of which is other than iron.

15. The skid plate of claim 13, wherein the elongated portion and mounting portions are cast of a metal the dominant portion of which is a ferrous based metal.

16. The skid plate of claim 13, wherein the elongated portion and mounting portions are formed of a polymer.

17. The skid plate of claim 13, wherein the skid plate abuts the concrete below the location of the front and rear saw mounts during use of the skid plate.

18. The skid plate of claim 12, wherein the support portion is curved about an axis generally parallel to the first axis by an amount selected to at least partially offset the deformation of the skid plate occurring when the saw urges the skid plate against the concrete surface during cutting.

19. A skid plate for use on a concrete cutting saw having a cutting blade that rotates about a first axis and extends through a slot in the skid plate to cut a groove in a concrete surface along a second axis that is orthogonal to the first axis, the skid plate comprising: first means for mounting the skid plate to the concrete saw and second means for supporting the concrete surface during cutting, the first and second means integrally cast with the skid plate, wherein the first means comprises two separate mounting means, one of which comprises a slot extending along an axis toward and away from the second means and configured to receive a pin oriented substantially parallel to the rotational axis and the other of which comprises a slot that is substantially parallel to the concrete surface during cutting.

20. The skid plate of claim 19, wherein the first and second means are formed of cast metal.

21. The skid plate of claim 19, where the first and second means are cast of a metal the dominant portion of which is other than iron.

22. The skid plate of claim 21, where the first and second means are cast of a polymer.

23. The skid plate of claim 19, further comprising a plate configured to abut a bottom of the skid plate and means for releasably fastening the plate to the skid plate.

24. The skid plate of claim 23, further comprising a slot in the plate located to coincide with the slot in the skid plate.

* * * * *